(12) United States Patent
Hattori

(10) Patent No.: US 9,131,087 B2
(45) Date of Patent: Sep. 8, 2015

(54) APPARATUS, SYSTEM AND METHOD FOR PROVIDING PRINT MANAGER SERVICE

(71) Applicant: Tomoki Hattori, Suwanee, GA (US)

(72) Inventor: Tomoki Hattori, Suwanee, GA (US)

(73) Assignee: RICOH COMPANY, LTD., Tokyo (JP)

( * ) Notice: Subject to any disclaimer, the term of this patent is extended or adjusted under 35 U.S.C. 154(b) by 178 days.

(21) Appl. No.: 13/779,687

(22) Filed: Feb. 27, 2013

(65) Prior Publication Data
US 2014/0240739 A1 Aug. 28, 2014

(51) Int. Cl.
*G06F 3/12* (2006.01)
*H04N 1/00* (2006.01)

(52) U.S. Cl.
CPC .......... *H04N 1/00413* (2013.01); *G06F 3/1219* (2013.01); *G06F 3/1225* (2013.01); *G06F 3/1239* (2013.01); *G06F 3/1285* (2013.01); *H04N 1/00233* (2013.01); *G06F 3/1204* (2013.01); *H04N 2201/0082* (2013.01); *H04N 2201/0093* (2013.01); *H04N 2201/0094* (2013.01)

(58) Field of Classification Search
CPC ................................................ H04N 1/00973
See application file for complete search history.

(56) References Cited

U.S. PATENT DOCUMENTS

| | | | |
|---|---|---|---|
| 7,065,564 B2 * | 6/2006 | Machida | 709/222 |
| 7,158,248 B2 * | 1/2007 | Smith et al. | 358/1.15 |
| 7,426,046 B2 * | 9/2008 | Shirai et al. | 358/1.13 |
| 7,793,285 B2 | 9/2010 | Hattori et al. | |
| 8,185,887 B2 * | 5/2012 | Hattori | 717/174 |
| 8,261,259 B2 | 9/2012 | Hattori | |
| 2006/0250638 A1 * | 11/2006 | Wang et al. | 358/1.15 |
| 2007/0233834 A1 | 10/2007 | Hattori et al. | |
| 2008/0235241 A1 | 9/2008 | Hattori et al. | |
| 2009/0059272 A1 | 3/2009 | Matsushita et al. | |
| 2011/0261391 A1 | 10/2011 | Oba et al. | |

OTHER PUBLICATIONS

U.S. Appl. No. 13/312,392, Kazutaka Oba et al., Dec. 6, 2011.

* cited by examiner

*Primary Examiner* — Ashish K Thomas
*Assistant Examiner* — Neil R McLean
(74) *Attorney, Agent, or Firm* — Cooper & Dunham LLP

(57) ABSTRACT

Tools (e.g., systems, apparatuses, application software, etc.) are provided for managing print services provided to terminal apparatuses. More specifically, each of the terminal apparatuses has deployed thereon a print manager service client agent that communicates with a print manager service providing apparatus over a network, in an automated manner and transparent to a user, without requiring administrative login on either end.

18 Claims, 45 Drawing Sheets

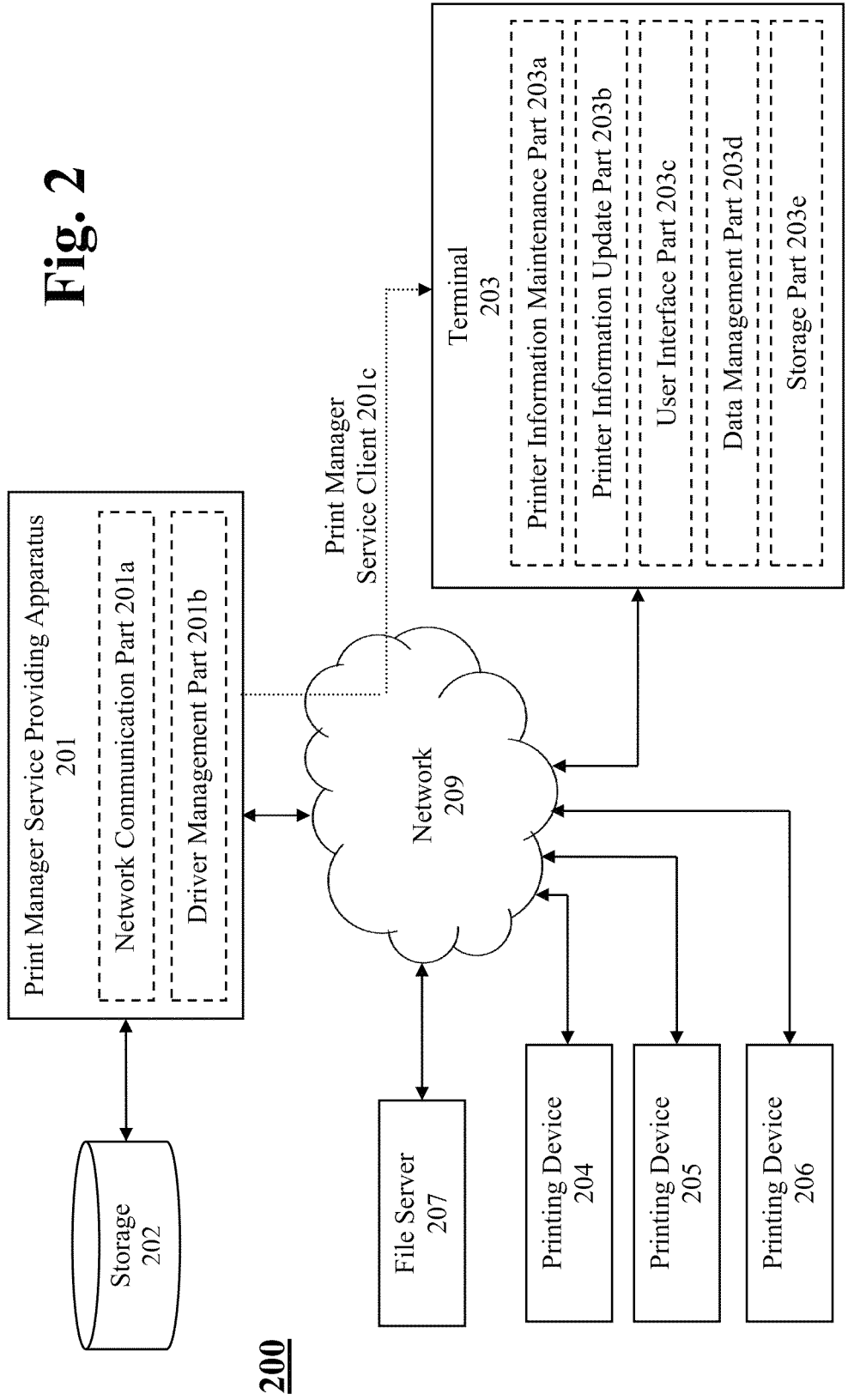

DEVICE SETTINGS INFORMATION (Printer A, User X)

| Setting Name | Setting Type | Default Value | Options |
|---|---|---|---|
| Paper Size | Print | Letter | A4, Legal, Letter, Executive, A5, A6, B5, B6 |
| Duplex | Print | No | Yes, No |
| Pages Per Sheet | Print | 1 | 1, 2-in-1, 4-in-1, 9-in-1, 16-in-1, 25-in-1, 1 in 2x2 pages, 1 in 3x3 pages, 1 in 4x4 pages, 1 in 5x5 pages |
| Orientation | Print | Portrait | Portrait, Landscape |
| ... | ... | ... | ... |
| Time Zone | Date/Time | GMT – 05:00 | GMT, GMT + 01:00, GMT + 02:00 . . . GMT – 01:00 |

Fig. 3A

PRINTER INFORMATION

| ID | Name | Address | Serial Number | MAC Address | Status |
|---|---|---|---|---|---|
| 1 | Printer A | 172.18.121.1 | Z000140192 | 00-4C-AE-F6-CA-A7 | On |
| 2 | Printer B | 172.18.121.2 | Z002002595 | 00-33-C6-C7-D3-A3 | On |
| 3 | Printer C | 172.18.121.3 | Z001924859 | 00-1F-08-CE-38-F8 | Off |
| 4 | Printer D | 172.18.121.4 | 0029582 | 00-64-DD-15-22-B8 | Sleep |
| 5 | Printer E | 172.18.121.5 | 1000229586 | 00-19-21-7A-0F-0D | On |
| 6 | Printer F | 172.18.121.6 | 9772338035 | 00-DA-ED-62-2E-78 | Sleep |
| 7 | Printer G | 172.18.121.7 | 0124325331 | 00-91-FC-53-9F-BE | On |
| 8 | Printer H | 172.18.121.8 | 0120324647 | 00-84-B3-C4-24-36 | On |
| 9 | Printer I | 172.18.121.9 | 0127347369 | 00-E9-D4-AE-C1-8F | On |
| 10 | Printer J | 172.18.121.10 | 0127347369 | 00-89-53-6D-ED-93 | Off |
| 11 | Printer K | 172.18.121.11 | 0129984848 | 00-6D-07-1D-6C-C9 | Sleep |
| 12 | Printer L | 172.18.121.12 | 9526355 | 00-57-83-EC-2A-FD | Sleep |
| 13 | Printer M | 172.18.121.13 | 9526991 | 00-D9-7E-E7-95-05 | On |
| 14 | Printer N | 172.18.121.14 | 9526700 | 00-88-E7-D6-28-21 | Sleep |

Fig. 3B

AVAILABLE PRINTER SETTINGS INFORMATION

| Grouping | Printer | Assignment | Printer Settings | | |
| --- | --- | --- | --- | --- | --- |
| | | | Paper size | Color | Duplex |
| Printer Group A | Printer X<br>Printer Y | Terminal Group A<br>Terminal Group B | A4, letter | B/W only | 2-sided only |
| Printer Group B | Printer X<br>Printer Z | Terminal Group C | A4 only | B/W only | 1-sided only |

Fig. 3C

DEFAULT PRINTER SETTINGS INFORMATION

| Grouping | Printer | Assignment | Printer Settings | | |
|---|---|---|---|---|---|
| | | | Paper size | Color | Duplex |
| Printer Group A | Printer X<br>Printer Y | Terminal Group A<br>Terminal Group B | Letter | B/W | 2-sided |
| Printer Group B | Printer X<br>Printer Z | Terminal Group C | A4 | B/W | 1-sided |

Fig. 3D

AVAILABLE PRINTER SETTINGS INFORMATION

| Printer | Grouping | Printer Settings | | |
|---|---|---|---|---|
| | | Paper size | Color | Duplex |
| Printer X | Terminal Group A | A4, letter | B/W only | 2-sided only |
| | Terminal Group B | Letter only | B/W, color | 2-sided only |
| Printer Y | Terminal Group A | A4, letter | B/W, color | 2-sided only |
| | Terminal Group B | Letter only | B/W only | 1-sided, 2-sided |
| | Terminal Group C | A4 only | B/W only | 1-sided only |
| Printer Z | Terminal Group C | A4 only | B/W only | 1-sided only |

Fig. 3E

DEFAULT PRINTER SETTINGS INFORMATION

| Printer | Grouping | Printer Settings | | |
|---|---|---|---|---|
| | | Paper size | Color | Duplex |
| Printer X | Terminal Group A | Letter | B/W | 2-sided |
| | Terminal Group B | Letter | Color | 2-sided |
| Printer Y | Terminal Group A | Letter | B/W | 2-sided |
| | Terminal Group B | Letter | B/W | 1-sided |
| | Terminal Group C | A4 | B/W | 1-sided |
| Printer Z | Terminal Group C | A4 | B/W | 1-sided |

Fig. 3F

PRINTER GROUPING INFORMATION

| Printer Group | Printer | Assigned Terminal Group | Terminal |
|---|---|---|---|
| Printer Group X | Printer A | Terminal Group X | Terminal A |
| | | | Terminal B |
| | Printer B | | Terminal C |
| | | | Terminal D |
| Printer Group Y | Printer C | Terminal Group Y | Terminal B |
| | Printer D | | Terminal E |
| Printer Group Z | Printer C | Terminal Group Z | Terminal D |
| | | | Terminal E |
| | | | Terminal F |

| LIST OF CANDIDATE PRINTERS (FOR GROUP A) | | |
|---|---|---|
| Device Name | Model No. | IP Address |
| Printer X1 | X9284029 | 24.1.13.128 |
| Printer S1 | S9284289 | 24.1.13.129 |
| Printer X4 | X9284019 | 24.1.13.130 |

| TRANSACTION HISTORY LOG INFORMATION ||||
|---|---|---|---|
| Date | User | IP Address | Action |
| 1-2-13 00:24 | John_Doe | 24.8.12.71 | Printer created |
| 1-2-13 12:10 | John_Doe | 24.8.12.71 | Printer assigned to Groups X and Y |
| 1-2-14 14:02 | John_Doe | 24.8.12.71 | Client agent sent to Terminal A |
| 1-2-15 22:48 | John_Doe | 24.8.12.71 | Driver updated on Terminal A |

| PRINTER CONFIGURATION FILES ||
|---|---|
| File ID | File |
| 1 | printer-a-terminal-a-configuration.cfg |
| 2 | printer-a-terminal-b-configuration.cfg |
| 3 | printer-a-terminal-c-configuration.cfg |
| 4 | printer-b-terminal-b-configuration.cfg |
| 5 | printer-b-terminal-d-configuration.cfg |
| 6 | printer-c-terminal-b-configuration.cfg |

| PRINTER DRIVERS |||
|---|---|---|
| Printer | Version | Driver |
| Printer A | 1.04 | printer-a.dll |
| Printer B | 2.01 | printer-b.dll |
| Printer C | 1.0 | printer-c.dll |

| CONFIGURATION FILE ASSOCIATION INFORMATION ||||
|---|---|---|---|
| Printer | Terminal | File ID | File |
| Printer A | Terminal A | 1 | printer-a-terminal-a-configuration.cfg |
| Printer A | Terminal B | 2 | printer-a-terminal-b-configuration.cfg |
| Printer A | Terminal C | 3 | printer-a-terminal-c-configuration.cfg |
| Printer B | Terminal B | 4 | printer-b-terminal-b-configuration.cfg |
| Printer B | Terminal D | 5 | printer-b-terminal-d-configuration.cfg |

Fig. 3I

| TRANSACTION HISTORY LOG INFORMATION ||
|---|---|
| Date | Action |
| 1-2-14 14:02 | Client agent received |
| 1-2-15 22:48 | Driver for Printer C updated |
| 1-2-16 04:02 | Client agent updated |

| PRINTER CONFIGURATION FILES ||
|---|---|
| File ID | File |
| 2 | printer-a-terminal-b-configuration.cfg |
| 6 | printer-c-terminal-b-configuration.cfg |

| PRINTER DRIVERS |||
|---|---|---|
| Printer | Version | Driver |
| Printer A | 1.04 | printer-a.dll |
| Printer C | 1.0 | printer-c.dll |

Fig. 3J

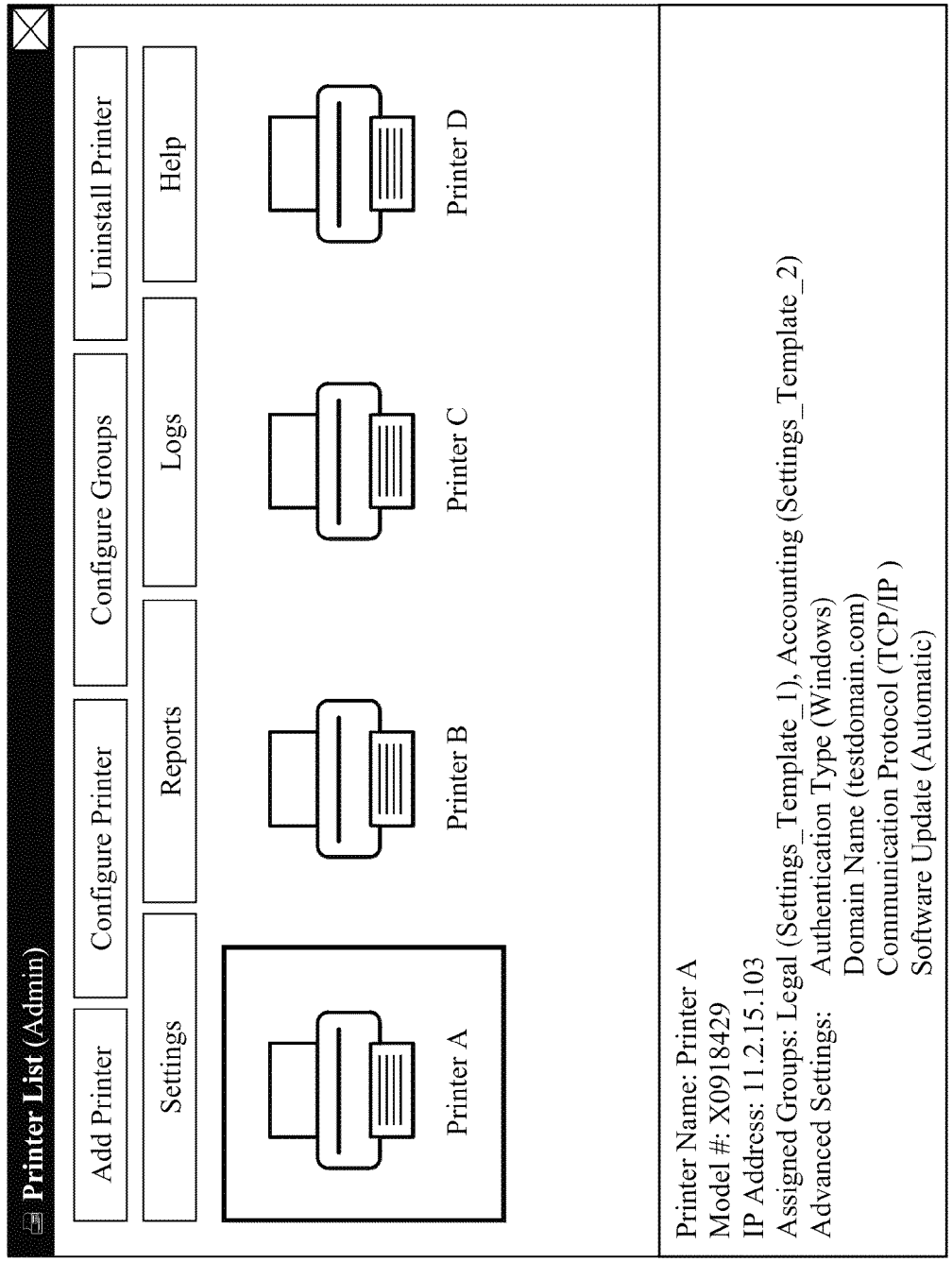

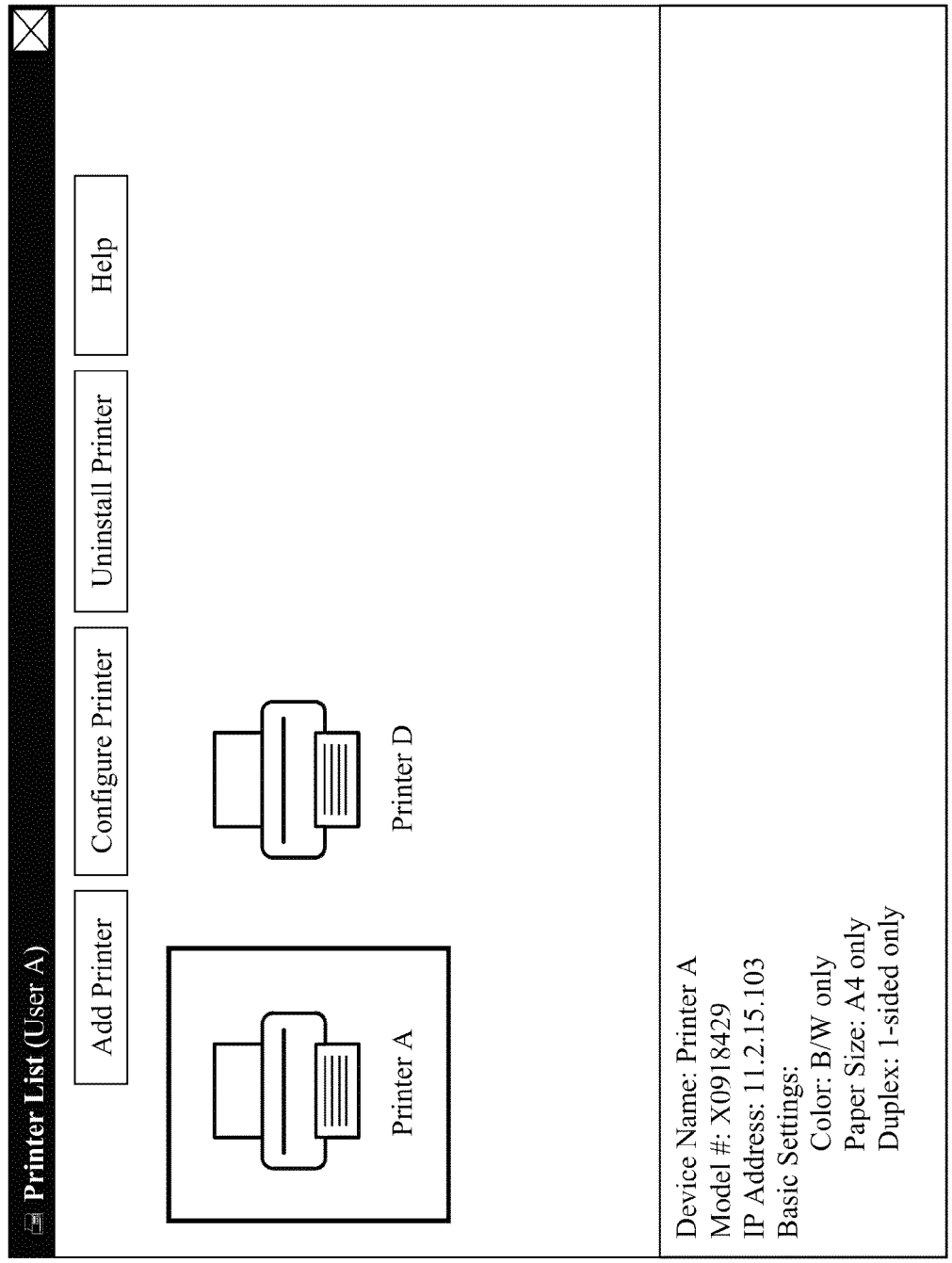

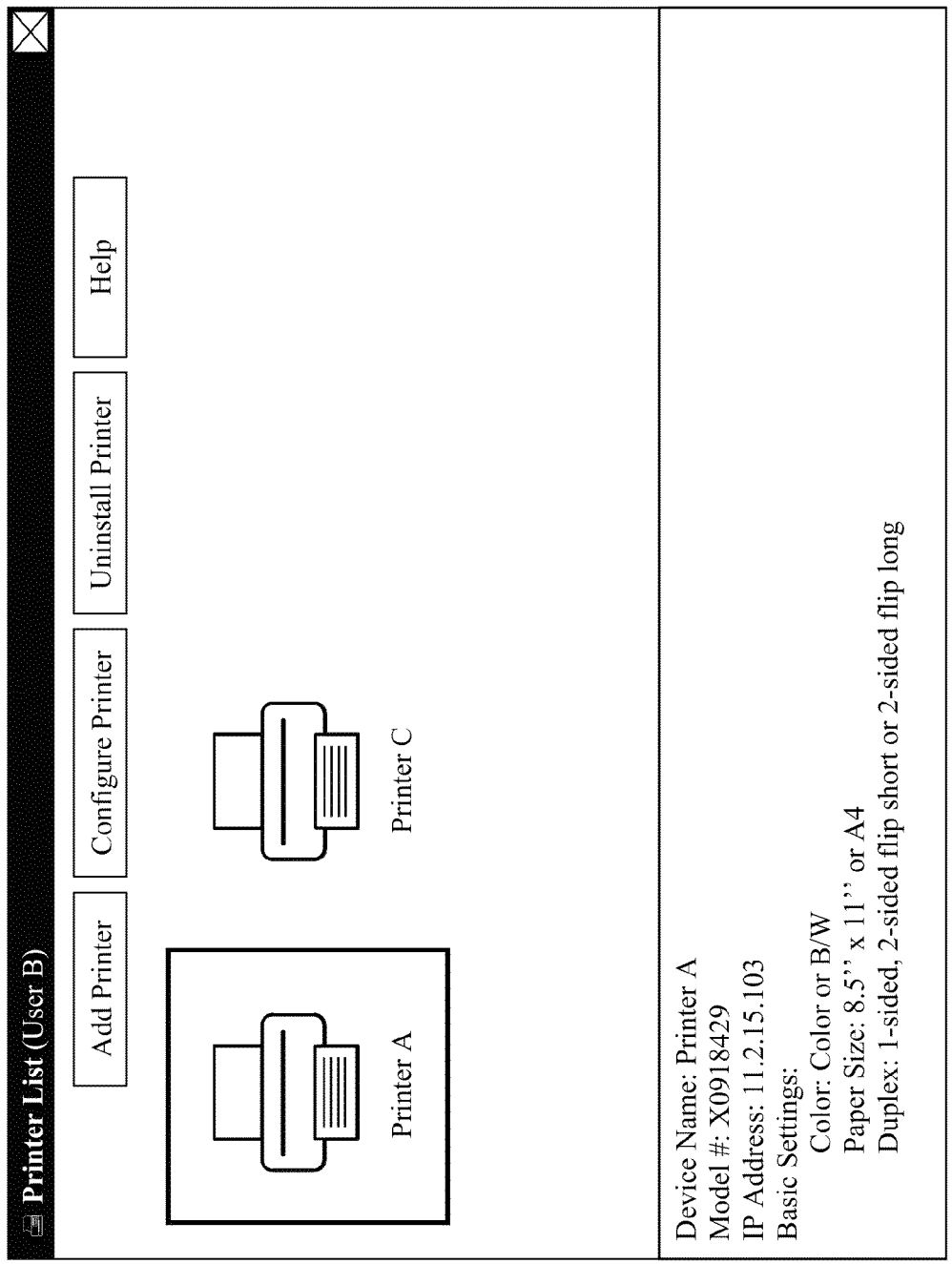

Fig. 9A

Configure Printer – Printer A (Admin)

Printer Name: Printer A

Groups:
- Legal
- Accounting

[Add] [Edit] [Delete]

Paper Source: Automatically Select ▶ [Edit]
Stapling: None ▶ [Edit]
Hole Punching: None ▶ [Edit]
Paper Size: 8.5 x 11 ▶ [Edit]
Orientation: Portrait ▶ [Edit]
Print on both sides: 1 Sided Print ▶ [Edit]
Pages per sheet: 1 Page Per Sheet ▶ [Edit]
Color: B/W ▶ [Edit]

[OK] [Cancel] [Help]

Fig. 9B

Configure Printer – Printer A (Admin)

Printer Name: [Printer A]

Groups
- Legal
- Accounting

[Add] [Edit] [Delete]

Paper Source: [Automatically Select ▶] [Edit]
Stapling: [1 Staple, Top Left ▶] [Edit]
Hole Punching: [None ▶] [Edit]
Paper Size: [8.5 x 11] [Edit]
Orientation: [Portrait ▶] [Edit]
Print on both sides: [2 Sided Print only] [Edit]
Pages per sheet: [1 Page Per Sheet ▶] [Edit]
Color: [B/W only] [Edit]

[OK] [Cancel] [Help]

Fig. 9G

Configure Printer – Printer A (Admin)

Printer Name: [Printer A]

Groups
- Legal
- Accounting

[Add] [Edit] [Delete]

Paper Source: [Automatically Select ▶] [Edit]

Stapling: [1 Staple, Top Left ▶] [Edit]

Hole Punching: [None ▶] [Edit]

Paper Size: [8.5 x 11] [Edit]

Orientation: [Portrait ▶] [Edit]

Print on both sides: [2 Sided Print only ▶] [Edit]

Pages per sheet: [1 Page Per Sheet ▶] [Edit]

Color: [Color ▶] [Edit]

[OK] [Cancel] [Help]

Configure Groups – Printer A (Admin)

| ID | Group Name | Printers | Users |
|---|---|---|---|
| 1 | Legal | A, D | X, Y, Z |
| 2 | IT | E | P, Q |
| 3 | Accounting | A, C | R, S |
| 4 | HR | B | O |
| 5 | Management | A, B, C, D | T |
| 6 | | | |

Add   Edit   Delete

OK   Cancel   Help

USER PREFERENCE SETTINGS INFORMATION (Printer A, User X)

| Setting Name | Setting Type | Specified Value |
|---|---|---|
| Paper Size | Print | Letter |
| Duplex | Print | Yes |
| Pages Per Sheet | Print | 2-in-1 |
| Orientation | Print | Portrait |
| ... | ... | ... |
| Time Zone | Date/Time | GMT – 05:00 |

Fig. 13B

APPARATUS, SYSTEM AND METHOD FOR PROVIDING PRINT MANAGER SERVICE

TECHNICAL FIELD

This disclosure relates to tools (such as systems, apparatuses, methodologies, computer program products, etc.) for providing print services to a plurality of terminals in a network.

BACKGROUND

In the current information age, information technology (IT) tools are extensively used, typically in a network environment, in enterprises and other organizations in order to facilitate output, communication and/or processing of information, such as documents and data, and there are often discussions of the desirableness of a paperless society. Notwithstanding the aforementioned discussions, there remains a great need by users of computers and other terminal devices (including tablets and mobile phones) for printing functionality. Therefore, devices having printing functionality, such as printers, copiers, multi-function devices (MFDs), etc., continue to play a significant role in information technology (IT) at home and at work.

Due to an increasing number of devices in the network environment and an increasing number of users who use such devices, IT administrators who manage and oversee the network environment need to manage access of the devices (or particular settings of such devices) allowed to the users.

In a conventional print management system, in order to allow one user to have access to certain functions of a printer while not allowing another user to access one or more of said functions (such as color printing), the IT administrator would need to create two separate printers (i.e. printer objects in the system), one with color printing function, and the other with only monochrome printing function, even though each such printer represents the same physical printer. Depending on the size of the network and the number of users, such procedure may become very cumbersome to the IT administrator.

Thus, there is a need for an improved approach for IT administrators to manage print services provided in a network environment.

SUMMARY

In an aspect of this disclosure, there are provided tools (for example, a system, an apparatus, application software, etc.) to help an administrator of a network environment manage print services provided to a plurality of users in the network environment. For example, a print manager service providing apparatus may be configured to provide a list of candidate printers through a network to a print manager service client agent operating on a terminal apparatus in the network environment. The print manager service client agent on the terminal apparatus compares the list of candidate printers to printer icon information maintained on the terminal apparatus, and in a case that a referenced printer listed amongst the candidate printers is not encompassed in the printer icon information, the print manager service client agent downloads, from the print manager service providing apparatus, printer information, including default printer settings, for the referenced printer and installs such printer in the printer icon information maintained on the terminal apparatus, in an automated manner without administrative login by a user on the terminal apparatus.

In a preferred configuration, communication by the print manager service providing apparatus of the list of candidate printers through the network to the print manager service client agent operating on the terminal apparatus is automated, without administrative login on the print manager service providing apparatus and without administrative login on the terminal apparatus, and is transparent to a user of the terminal apparatus and to a user of the print manager service providing apparatus. Likewise, download by the print manager service client agent of printer information, including default printer settings for the specific printer, from the print manager service providing apparatus is preferably automated, without administrative login on the print manager service providing apparatus nor administrative login on the terminal apparatus, and is transparent to the user of the terminal apparatus and to the user of the print manager service providing apparatus.

In another aspect, a print manager service client agent operating on a terminal apparatus, upon installation of a printer in printer icon information maintained on the terminal apparatus, communicates current printer settings, in the printer icon information maintained on the terminal apparatus for the printer, via a network to a print manager service providing apparatus, and the print manager service providing apparatus, in an automated manner without administrative login by a user on the print manager service providing apparatus, checks the current printer settings, received from the print manager service client agent, to verify that the printer is properly installed in the printer icon information maintained on the terminal apparatus.

In another aspect, a print manager service providing apparatus communicates an installer of a print manager service client agent to a terminal apparatus, and the installer, communicated by the print manager service providing apparatus to the terminal apparatus, deploys the print manager service client agent on the terminal apparatus and causes the print manager service client agent to operate on the terminal apparatus, in an automated manner without administrative login by a user on the terminal apparatus.

In another aspect, a print manager service providing apparatus is configured to provide a user interface for specifying groupings of printers selected from a plurality of registered printers. At least one printer is included in each of at least two groupings of printers, and that specific printer is represented by a single printer icon in the user interface and is associated with each of said at least two groupings of printers. Default printer settings maintained for the specific printer in association with one grouping can be different than default printer settings maintained for the specific printer in association with another grouping, amongst said at least two groupings of printers.

In another aspect, a print manager service providing apparatus is configured to provide a user interface for specifying a terminal settings template for a grouping of printers, and a manager service agent that communicates with a print manager service client agent on a terminal apparatus, compiles printer grouping information based on the terminal settings template for the grouping of printers, compiles a list of candidate printers including the printer grouping information, and causes the list of candidate printers to be communicated to the terminal apparatus.

In another aspect, default printer settings maintained by a print manager service providing apparatus for a specific printer in association with one group of terminals can be different than default printer settings maintained for the printer in association with another group of terminals, and the specific printer is represented by a single printer icon in the user interface and is associated with each of said one group of terminals and said another group of terminals.

In another aspect, a print manager service providing apparatus is configured to provide a configuration user interface for allowing a user to specify an order in which terminal apparatuses are to be updated with printer information (where the updates on the terminal apparatuses would be performed in an automated manner without administrative login by a user on the terminal apparatus and without administrative login by a user on the print manager service providing apparatus).

BRIEF DESCRIPTION OF THE DRAWINGS

The aforementioned and other aspects, features and advantages can be more readily understood from the following detailed description with reference to the accompanying drawings wherein:

FIG. 2 shows a block diagram of a system for managing a plurality of network-connected devices, according to another exemplary embodiment;

FIG. 3A shows sample device settings information, according to an exemplary embodiment;

FIG. 3B shows sample printer information, according to an exemplary embodiment;

FIG. 3C shows sample available printer settings information, according to an exemplary embodiment;

FIG. 3D shows sample default printer settings information, according to an exemplary embodiment;

FIG. 3E shows another sample available printer settings information, according to an exemplary embodiment;

FIG. 3F shows another sample default printer settings information, according to an exemplary embodiment;

FIG. 3G shows sample printer grouping information, according to an exemplary embodiment;

FIG. 3H shows an exemplary list of candidate printers, according to an exemplary embodiment;

FIG. 3I shows sample data maintained by a data management part, according to an exemplary embodiment;

FIG. 3J shows sample data maintained by a data management part, according to another exemplary embodiment;

FIG. 8A shows sample screenshots of a user interface displayed to the user, according to an exemplary embodiment;

FIG. 8B shows sample screenshots of a user interface displayed to the user, according to an exemplary embodiment;

FIG. 8C shows sample screenshots of a user interface displayed to the user, according to an exemplary embodiment;

FIG. 9A shows a sample screenshot of a user interface for configuring a printer, according to an exemplary embodiment;

FIG. 9B shows a sample screenshot of a user interface for configuring a printer, according to an exemplary embodiment;

FIG. 9G shows a sample screenshot of a user interface for configuring a printer, according to an exemplary embodiment;

FIGS. 10A-10C show sample screenshots of a user interface for configuring groups, according to an exemplary embodiment;

FIG. 13B shows sample user preference settings information, according to an exemplary embodiment;

DETAILED DESCRIPTION

Figure 1A:
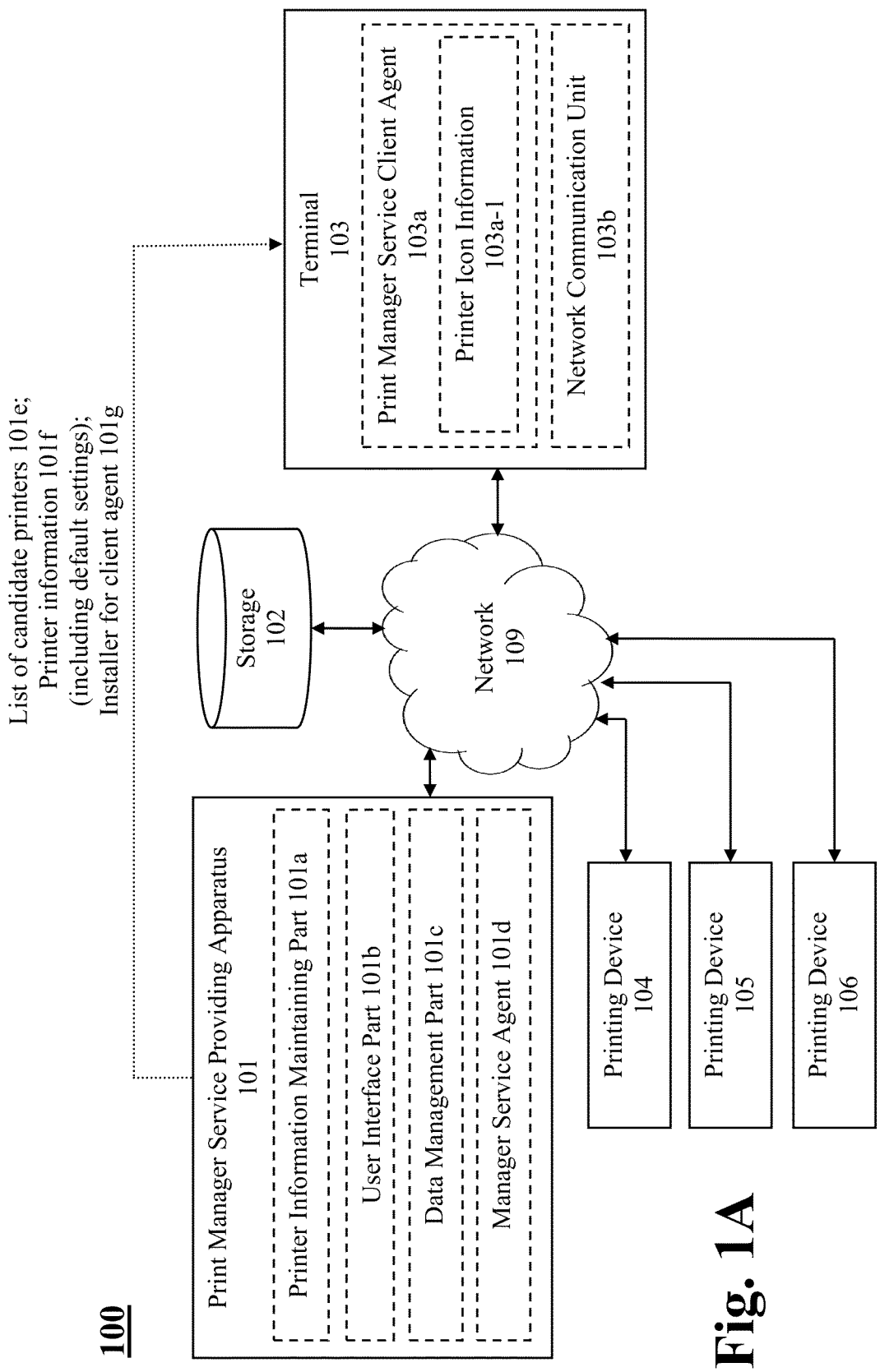
FIG. 1A shows a block diagram of a system for managing a plurality of network-connected devices, according to an exemplary embodiment.

In describing preferred embodiments illustrated in the drawings, specific terminology is employed for the sake of clarity. However, the disclosure of this patent specification is not intended to be limited to the specific terminology so selected and it is to be understood that each specific element includes all technical equivalents that operate in a similar manner. In addition, a detailed description of known functions and configurations will be omitted when it may obscure the subject matter of the present invention.

Referring now to the drawings, wherein like reference numerals designate identical or corresponding parts throughout the several views, there is described tools (systems, apparatuses, methodologies, computer program products, etc.) for providing print services to a plurality of terminal apparatuses (e.g. computer, notebook, personal digital assistant, tablet computing device, smartphone, etc.) over a network.

For example, FIG. 1A shows schematically a system 100 for providing print services over a network, according to an exemplary embodiment. The system 100 includes a print manager service providing apparatus 101, a storage 102, a terminal 103 and printing devices 104-106, all of which are interconnected by a network 109.

The print manager service providing apparatus 101 includes printer information maintaining part 101a, a user interface part 101b, a data management part 101c and a manager service agent 101d.

The printer information maintaining part 101a maintains printer information for a plurality of registered printers. For example, an example of such printer information is shown in FIG. 3B. As shown in FIG. 3B, for each registered printer (e.g. Printer A, Printer B, Printer C, etc.), corresponding printer information is maintained. The printer information maintaining part 101a also maintains default printer settings for specific printers in association with one or more groupings of such registered printers. For example, an example of such default printer settings is shown in FIG. 3A (e.g. the "default value" column). Such default printer settings may be specified, for example, by an administrator via a user interface provided by the user interface part 101b, such as shown in FIG. 9A, which is described infra in greater detail.

Figure 12:
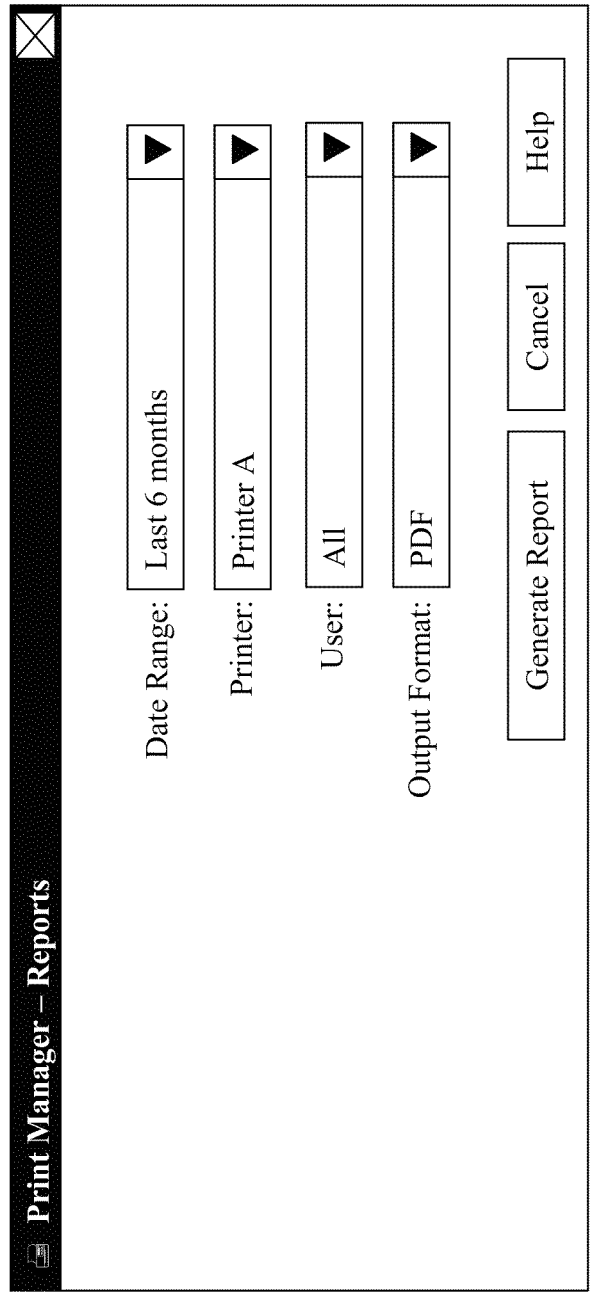
FIG. 12 shows a sample screenshot of a user interface for generating a report, according to an exemplary embodiment.

The user interface part 101b provides a user interface for specifying groupings of printers selected from the plurality of registered printers, such as shown in FIG. 9A. The user (e.g. administrator of the network environment) may assign the printer ("Printer A") to an additional group by activating the "add" button on the left side of the screen. The example of FIG. 9A shows that "Printer A" has been assigned to the groups "legal" and "accounting". The user interface part 101b also provides a user interface for a terminal settings template for a grouping of printers, such as shown in FIG. 10B. In the example of FIG. 10B, the user has selected the template "USPTO filing" for Printer A, and such selected terminal settings template is associated with the user of the selected printer ("Printer A") by the particular group ("legal"). The user interface shown in FIG. 10B also allows the user to specify groups of terminals selected from a plurality of terminals apparatuses. In FIG. 10B, the user may add or delete users from the "legal" group. Instead of adding or deleting individual users, individual terminals may be added or delete, or groups of users and/or terminals may be added or deleted in another exemplary embodiment. In addition, the user interface part 101b may provide a report user interface for the user to specify a report to be generated (FIG. 12).

The data management part 101c maintains a transaction history log indicating transactions with the print manager service, printer configuration files, printer drivers, and configuration file association information, etc. Such data are stored, for example, in an internal storage unit resident in the print manager service providing apparatus 101 or in an external storage unit accessible via the network 209 (e.g. storage 102). Examples of such data are shown in FIG. 3I.

The manager service agent 101d communicates with the print manager service client agent 103a on the terminal 103, compiles printer grouping information based on the terminal settings template for the grouping of printers, compiles the list of candidate printers 101e including the printer grouping information, and causes the list of candidate printers 101e to be communicated to the terminal 103.

The manager service agent 101d (e.g., server agent) and the client agent 103a described in the present disclosure may be any software programs that are configured to act on behalf of the server and the client, respectively, and such agents may communicate with each other using various protocols, including HTTP (Hypertext Transfer Protocol) and/or SNMP (Simple Network Management Protocol).

The print manager service providing apparatus 101 further conveys printer information 101f which includes default settings for one or more printing devices 104-106, and an installer for client agent 101g which deploys the print manager service client agent 103a on the terminal 103 and causes the print manager service client agent 103a to operate on the terminal 103.

Many printers and other devices (e.g. printing devices 104-106) store data indicating their attributes or properties in a Management Information Base (MIB). The MIB may conform with the SNMP (Simple Network Management Protocol), and device settings information can be obtained directly from the MIB through SNMP queries. The device settings information can also be obtained using other known protocols. In this way, the printer information maintaining part 101a may collect the device settings information from the printing devices 104-106 and store the collected device settings information, for example, in the storage 102.

An example of device settings information collected by the printer information maintaining part 101a from the printing devices 104-106 is illustrated in FIG. 3A. As seen in FIG. 3A, the device settings information for each printing device may include a variety of attributes such as setting name, setting type, default value of the setting, and the options selectable for the setting. The information depicted in FIG. 3A is merely exemplary, and a wide range of other device preference settings, such as network settings, authentication settings, log settings, image settings, print settings and etc., may be included in the device settings information collected by the data settings management units. As non-limiting examples, "device group" indicating the group to which the particular printing device belongs in a network environment, "SNMPv3" indicating whether SNMPv3 (Simple Network Management Protocol, version 3) is enabled, "reception protocol" indicating a protocol used for e-mail reception, "memory overflow" indicating an action to perform in the event of a memory overflow (e.g. do not print), "toner saving" indicating whether a toner saving mode is enabled, "firmware update" indicating whether firmware update is permitted, and so forth.

In a similar manner, the printer information maintaining part 101 may collect printer information indicating printer ID, device type, IP address, serial number, MAC address, status information, etc. of the one or more printers connected to the network 109. Such printer information is shown in FIG. 3B.

Further, (i) available printer settings information indicating the settings available for each grouping of the printers and terminals and (ii) default printer settings information indicating the default settings for each grouping of the printers and terminals may be maintained by the printer information maintaining part 101a. Examples of such information are shown in FIGS. 3C-3F. Such information may be received via a user interface provided to the user of the print manager service providing apparatus 101 (e.g. administrator of the network environment), such as shown in FIGS. 9A and 9B. Although FIGS. 3C-3F only show basic printer settings (e.g. "B/W", "2-sided", "A4"), the settings maintained by the print manager service providing apparatus are not limited to such settings and may include other advanced settings discussed in the present application.

In addition, the printer information maintaining part 101a may also maintain printer grouping information, which indicates the groups of printing devices and groups of terminals and which group of terminals is assigned to which group of printers. An example of such information is shown in FIG. 3G.

FIG. 3H shows an example of a list of candidate printers provided to the terminal 103. As discussed above, such list may be compiled based on the determination of the printers to which the terminal 103 has access according to the printer grouping information (FIG. 3G).

FIG. 3I shows examples of transaction history log information (for keeping track of all the actions taking place in the system 100), printer configuration files, printer drivers, and configuration file association information (indicating which configuration files are associated with which printers and/or terminals) maintained for the entire network environment. On the other hand, FIG. 3J shows examples of transaction history log information, printer configuration files and printer drivers maintained for a particular terminal (e.g. Terminal B).

The information (such as shown in FIGS. 3A-3I) collected and/or stored in the system 100 is not limited to those discussed in the present disclosure, and may include other information relevant to providing print manager services. Such information can be stored in an internal storage resident in the print manager service providing apparatus 101. Alternatively, the device settings information can be stored externally in a storage unit connected to the print manager service providing apparatus or accessible via the network 109 (e.g. storage 102), and retrieved as needed. For example, the information may be stored in one or more databases [e.g. off-the-shelf database applications based on SQL (Structured Query Language), or other customized database applications with search/query function]. If the information is stored in more than one location, the information may be synced, for example, periodically or upon a user request.

The print manager service providing apparatus 101 may be realized by a computer program product including a computer-usable, non-transient medium (such as a disk storage apparatus) having instructions tangibly embodied therein that are executed by a computer. Thus, it should be understood that the print manager service providing apparatus 101 may be implemented on a terminal (e.g. computer). While the print manager service providing apparatus 101 is shown as being external to the printing devices 104-106, the print manager service providing apparatus 101 may in fact be a client terminal, a printing device and/or another printing device.

The print manager service providing apparatus 101 may include a data store that can comprise one or more structural or functional parts that have or support a storage function. For example, the data store can be, or can be a component of, a source of electronic data, such as a document access apparatus, a backend server connected to a document access apparatus, an e-mail server, a file server, a multi-function peripheral device (MFP or MFD), a voice data server, an application server, a computer, a network apparatus, a terminal etc. It should be appreciated that the term "electronic document" or "electronic data", as used herein, in its broadest sense, can comprise any data that a user may wish to access, retrieve, review, etc.

The terminal 103 includes print manager service client agent 103a which maintains printer icon information 103a-1, and a network communication unit 103b for communicating with various devices (e.g. print manager service providing apparatus 101) via the network 109. For example, the printer icon information 103a-1 includes printer icons such as shown in FIG. 8B, each of which represents a printer installed on the terminal 103. The printer icon information 103a-1 may also include any other information regarding the printers installed on the terminal 103. The terminal 103 is further described infra with reference to FIG. 5.

The printing devices 104-106 may include, for example, a printer, a facsimile machine and/or a multi-function device (MFD). While this example of this disclosure simply refers to printing devices 104-106 in the interest of brevity, the aspects of this disclosure are applicable to a network environment having an arbitrary number of devices.

It should be appreciated that while only the terminal 103 and the printing devices 104-106 are shown in the example of FIG. 1A, the system 100 can include more terminals and printing devices. Indeed, the print manager system of this disclosure is preferably configured to be scalable such that terminals and IT devices can be added to the system as desired and needed (e.g. to serve more users).

The network 109 can be a local area network, a wide area network or any type of network such as an intranet, an extranet (for example, to provide controlled access to external users, for example through the Internet), a private or public cloud network, the Internet, etc., or a combination thereof. Further, other communications links (such as a virtual private network, a wireless link, etc.) may be used as well for the network 109. In addition, the network 109 preferably uses TCP/IP (Transmission Control Protocol/Internet Protocol), but other protocols such as SNMP (Simple Network Management Protocol) and HTTP (Hypertext Transfer Protocol) can also be used. How devices can connect to and communicate over networks is well-known in the art and is discussed for example, in "How Networks Work", by Frank J. Derfler, Jr. and Les Freed (Que Corporation 2000) and "How Computers Work", by Ron White, (Que Corporation 1999), the entire contents of each of which are incorporated herein by reference.

Figure 1B:
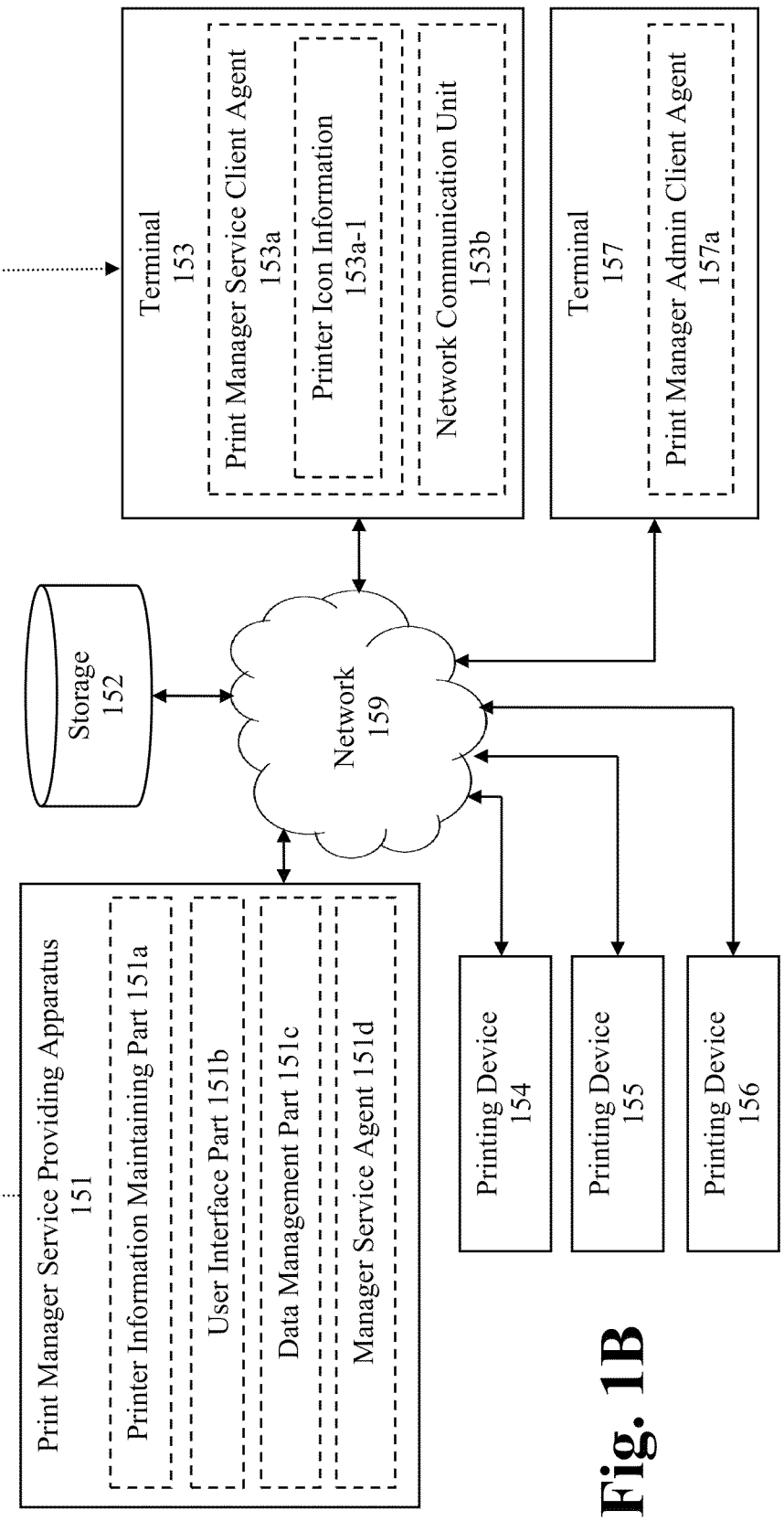
FIG. 1B shows a block diagram of a system for managing a plurality of network-connected devices, according to another exemplary embodiment.

FIG. 1B shows schematically a system 150 for providing print services over a network, according to an exemplary embodiment. The system 150 includes a print manager service providing apparatus 151, a storage 152, a terminal 153, printing devices 154-156 and a network 156, all of which are similar to the corresponding elements of the system 100 of FIG. 1A.

The system 150 additionally includes a terminal 157 on which is a print manager admin client agent 157a. For example, the terminal 157 is operated by an administrator of the system 150, and the administrator is allowed to configure the print manager service providing apparatus 151 via the print manager admin client agent 157a. The print manager admin client agent 157a is configured to be used by an administrator of the network environment, but otherwise is similar to the print manager service client agent 103a described in connection with FIG. 1A.

Otherwise, operations of the elements of the system 150 are similar to those discussed in connection with the corresponding elements of the system 100 of FIG. 1A.

FIG. 2 shows schematically a system 200 for providing print services over a network, according to an exemplary embodiment. The system 200 includes a print manager service providing apparatus 201 having a storage 202 connected thereto, a terminal 203, printing devices 204-206 and a file server 207, all of which are interconnected by a network 209.

The print manager service providing apparatus 201 includes a network communication part 201a and a driver management part 201b.

The network communication part 201a allows the print manager service providing apparatus 201 to communicate through the network 209, such as with the printing devices 204-206 and the terminal 203. The network communication unit 201a is configured to communicate with any particular device amongst plural heterogeneous devices that may be included in the system 200 in a communication format native to the particular device. For example, in the system 200, the network communication unit 201a communicates with each of the printing devices 204-206 in a communication format established by the respective manufacturers/vendors of the printing devices 204-206. The network communication unit 201a may determine an appropriate communication format native to the particular device by any of various known approaches. For example, the communication unit 201a may refer to a database or table, maintained internally or by an outside source, to determine an appropriate communication format native to the device. As another example, the network communication unit 201a may access an Application Program Interface (API) of the particular device, in order to determine an appropriate communication format native to the device.

The driver management part 201b provides a copy of the printer driver to the terminal 203, either upon request (e.g. user at terminal 203 or administrator) or after determining that an update of the driver installed on the terminal 203 is needed. The driver management part 201b may internally store a copy of the most recent version of the printer driver (e.g. for each of the printing device 204-206), or the most recent version of the printer driver may be obtained from a storage unit connected via the network 209 (e.g. the storage 207) and relayed to the terminal 203. The terminal 203 may also download the updated printer driver directly from such storage unit via the network 209.

In the system 200, the storage 202 is directly connected to the print manager service providing apparatus 201. As discussed above, the storage 202 may store various information and data generated and collected by the print manager services providing apparatus 201.

The print manager service providing apparatus 201 also provides to the terminal 203 a print manager service client 201c which configures the terminal 203 to include a printer information maintenance part 203a, a printer information update part 203b, a user interface part 203c which provides a user interface for configuring the print manager service client, a data management part 203d. The terminal 203 also includes a storage part 203e for storing the installer for the print manager service client, various printer drivers and configuration files, and other data necessary for utilizing the print manager services provided by the print manager service providing apparatus 201.

The printer information maintenance part 203a maintains printer icon information on the terminal 203. For example, such printer icon information indicates one or more printers installed on the terminal 203. Each of such printers may be represented by a single icon in a printer list screen, such as shown in FIG. 8B. The printer icon information may also include any other information regarding the one or more printers installed on the terminal 203, such as the name, network address, settings, etc. of the printers, such as shown in FIG. 3B.

The printer information update part 203b communicates with a print manager service providing apparatus 201, through a network communication unit, to receive a list of candidate printers, and compares the list of candidate printers to the printer icon information maintained by the printer information maintenance part 203a on the terminal 203. In a case that one or more referenced printers in the list of candidate printers is not encompassed in the printer icon information maintained on the terminal 203, the printer information update part 203b downloads, with respect to each specific printer amongst the referenced printers not encompassed in the printer icon information, printer information, including default printer settings, for the specific printer and installs, without administrative login on the terminal 203, the specific printer in the printer icon information maintained by the printer information maintenance part 203a. For example, the specific printer is installed by downloading a printer driver and configuration files associated with the specific printer and installing the printer driver and configuring the specific printer using the printer settings included in the configuration files.

Figure 11A:
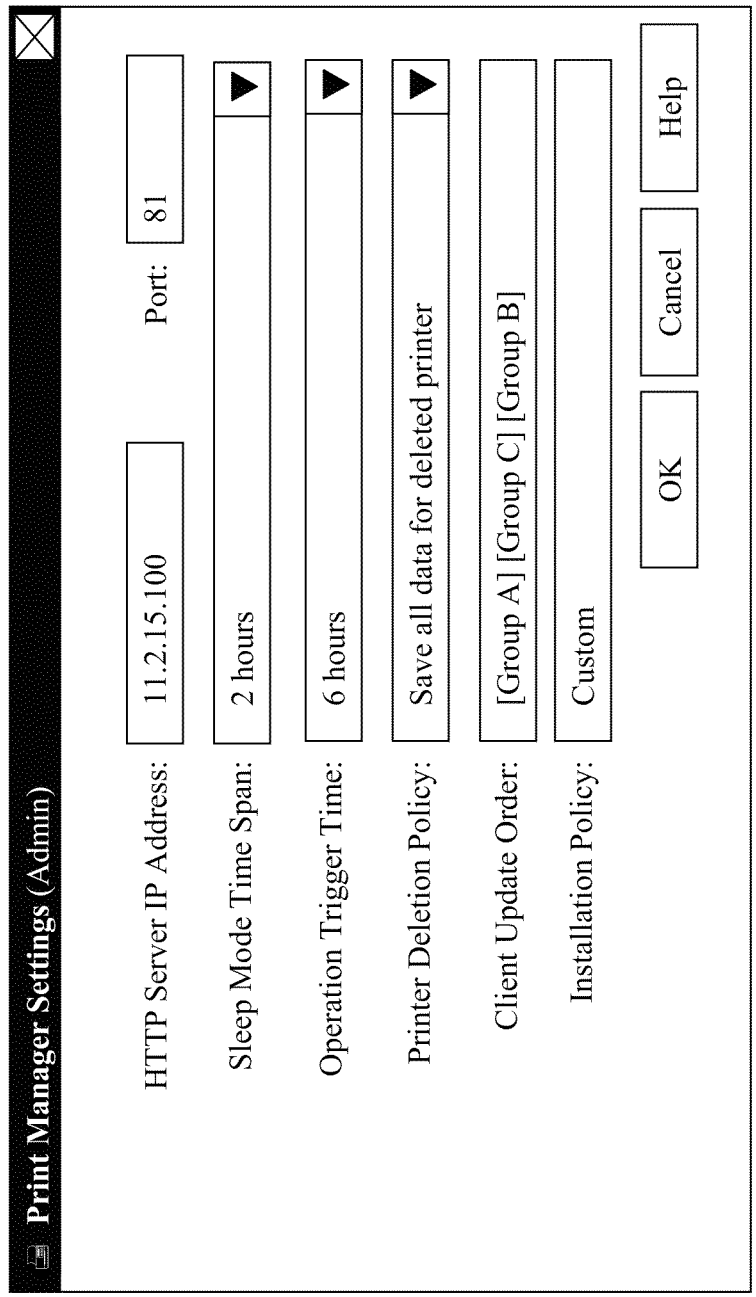
FIG. 11A shows a sample screenshot of a user interface for configuring print manager settings, according to an exemplary embodiment.

The user interface part 203c provides a configuration user interface for a user to configure the print manager service client 201c, permitting the user to configure the properties of the print manager service client 201c, for example, including: network address of the print manager service; a time span of the print manager service client, after which time span, the print manager service client enters a sleep mode or is suspended; a trigger time indicating a maximum amount of time in which the print manager service client remains suspended or in the sleep mode, after which the print manager service client returns to operation; printer deletion policy governing deletion of any printer from the printer icon information. An example of such user interface is shown in FIG. 11A. The user interface part 203c also provides a report user interface, such as shown in FIG. 12, for allowing a user to generate a report. For example, such report is generated based on stored log information, such as shown in FIG. 3I ("transaction history log information").

The data management part 203d maintains a transaction history log indicating transactions with the print manager service, printer configuration files, printer drivers, and configuration file association information, etc. Such data are stored, for example, in the storage part 203e or in an external storage unit accessible via the network 209. Examples of such data are shown in FIG. 3I.

The file server 207 is a server that stores various data and files downloadable by the print manager service providing apparatus 201 and/or the terminal 203. As shown in FIG. 2, the file server 207 is connected to the print manager service providing apparatus 201 and the terminal 203 via the network 209, and upon the request of the print manager service providing apparatus 201 or the terminal 203 for data or files (e.g. updated printer driver), the file server 207 transmits the requested data/files via the network 209.

Otherwise, operations of the elements of the system 200 are similar to those discussed in connection with the corresponding elements of the system 100 of FIG. 1A.

Figure 4:
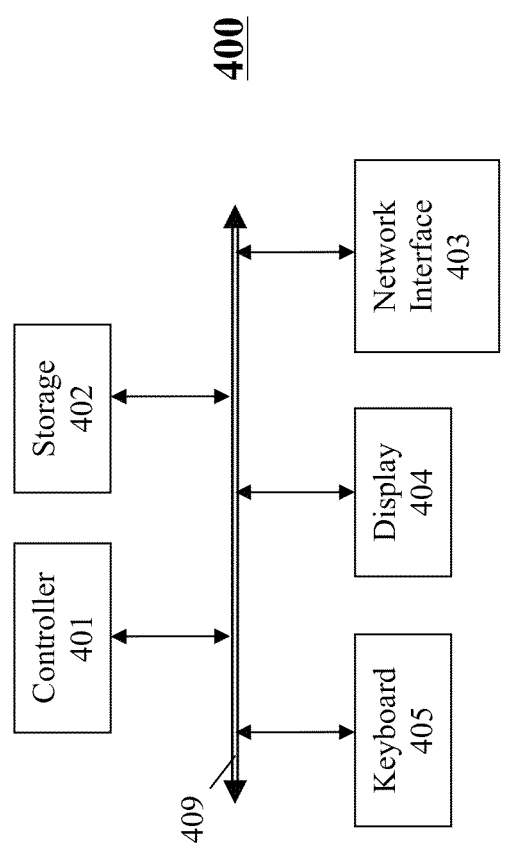
FIG. 4 shows a block diagram of an exemplary configuration of a print manager service providing apparatus, such as illustrated in FIG. 1A, according to an exemplary embodiment.

FIG. 4 shows an exemplary constitution of a computing device that can be configured (for example, through software) to operate (at least in part) as the print manager service providing apparatus 101 of FIG. 1A. As shown in FIG. 4, the management unit 400 includes a controller (or central processing unit) 401 that communicates with a number of other components, including memory or storage part 402, network interface 403, display 404 and keyboard 405, by way of a system bus 409.

The management unit 400 may be a special-purpose device (such as including one or more application specific integrated circuits or an appropriate network of conventional component circuits) or it may be software-configured on a conventional personal computer or computer workstation with sufficient memory, processing and communication capabilities to operate as a terminal and/or server, as will be appreciated to those skilled in the relevant arts.

In the management unit 400, the controller 401 executes program code instructions that control device operations. The controller 401, memory/storage 402, network interface 403, display 404 and keyboard 405 are conventional, and therefore in order to avoid obfuscating the inventive aspects of this disclosure, such conventional aspects will not be discussed in detail herein.

The management unit 400 includes the network interface 403 for communications through a network, such as communications through the network 209 with the terminal 103 and the printing devices 104-106 in FIG. 1A. However, it should be appreciated that the subject matter of this disclosure is not limited to such configuration. For example, the management unit 400 may communicate with client terminals through direct connections and/or through a network to which some components are not connected. As another example, the management unit 400 does not need to be provided by a server that services terminals, but rather may communicate with the devices on a peer basis, or in another fashion.

The print manager service providing apparatus of the present disclosure is not limited to a server or computer, but can be manifested in any of various devices that can be configured to communicate over a network and/or the Internet.

Figure 5:
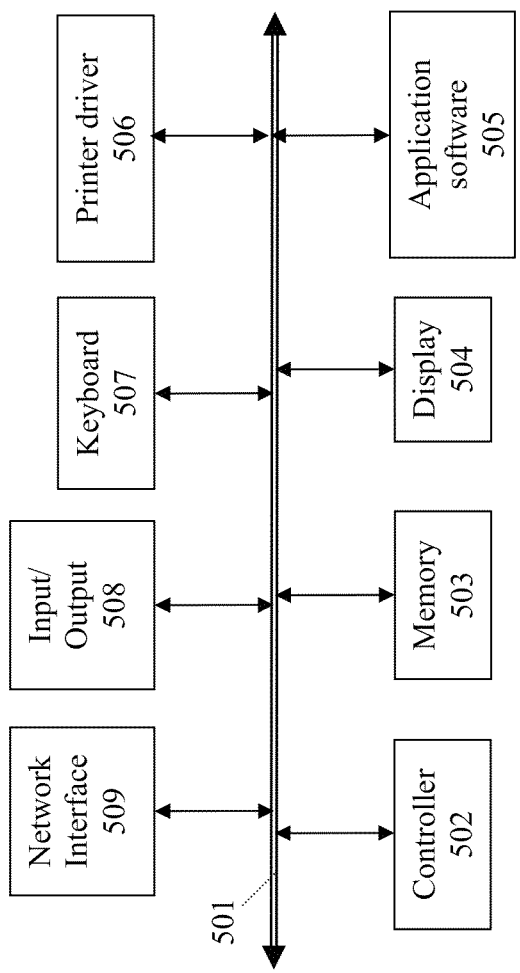
FIG. 5 shows a block diagram of an exemplary configuration of a terminal, such as illustrated in FIG. 1A, according to an exemplary embodiment.

An exemplary constitution of the terminal 103 of FIG. 1A (for example, as a computer) is shown schematically in FIG. 5. In FIG. 5, computer 500 includes a controller (or central processing unit) 502 that communicates with a number of other components, including memory 503, display 504, keyboard (and/or keypad) 507, other input/output (such as mouse, touchpad, stylus, microphone and/or speaker with voice/speech interface and/or recognition software, etc.) 508, network interface 509, print driver 506 and application software 505, by way of an internal bus 501.

The memory 503 can provide storage for program and data, and may include a combination of assorted conventional storage devices such as buffers, registers and memories [for example, read-only memory (ROM), programmable ROM (PROM), erasable PROM (EPROM), electrically erasable PROM (EEPROM), static random access memory (SRAM), dynamic random access memory (DRAM), non-volatile random access memory (NOVRAM), etc.].

The network interface 509 provides a connection (for example, by way of an Ethernet connection or other network connection which supports any desired network protocol such as, but not limited to TCP/IP, IPX, IPX/SPX, or NetBEUI) to the network to which the computer 500 is connected (e.g. network 109 of FIG. 1A).

The print driver 506 and application software 505 are shown as components connected to the internal bus 501, but in practice are typically stored in storage media such as a hard disk or portable media, and/or received through the network, and loaded into memory 503 as the need arises.

Depending on the type of the particular terminal device, one or more of the components shown in FIG. 5 may be missing. For example, a particular mobile phone may be missing the print driver 506 and the keyboard 507.

Additional aspects or components of the computer 500 are conventional (unless otherwise discussed herein), and in the interest of clarity and brevity are not discussed in detail herein. Such aspects and components are discussed, for example, in "How Computers Work", by Ron White (Que Corporation 1999), and "How Networks Work", by Frank J. Derfler, Jr. and Les Freed (Que Corporation 2000), the entire contents of each of which are incorporated herein by reference.

The terminal 103 of FIG. 1A (or other devices described in the present disclosure) may be any device including but not limited to a personal, notebook or workstation computer, a terminal, a kiosk, a personal digital assistant (PDA), a tablet computing device, a smartphone, a scanner, a printer, a facsimile machine, a multi-function device (MFD), a server, a mobile phone or handset, another information terminal, etc. Each device may be configured with software allowing the device to communicate through a network with a print manager service providing apparatus in the present disclosure.

Figure 6:
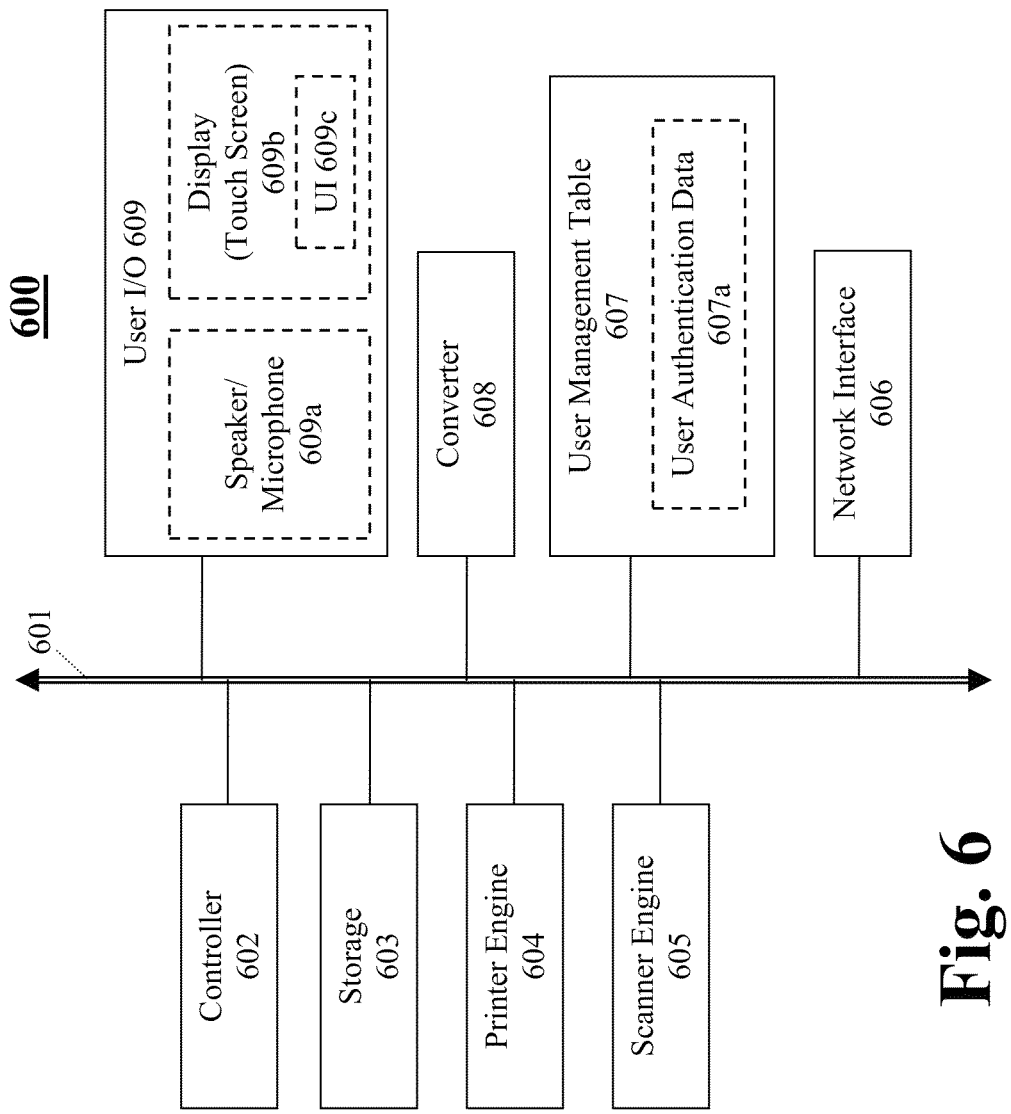
FIG. 6 shows a block diagram of an exemplary configuration of a printing device, such as illustrated in FIG. 1A, according to an exemplary embodiment.

FIG. 6 shows a schematic diagram of a configuration of a printing device as an MFD, according to an exemplary embodiment, which can be any apparatus (including a microprocessor chip or a collection of devices having varying degree of integration) that has the ability to perform two or more functionalities.

The MFD 600 shown in FIG. 6 includes a controller 602, and various elements connected to the controller 602 by an internal bus 601. The controller 602 controls and monitors operations of the MFD 600. The elements connected to the controller 602 include storage 603 (for example, random access memory, read-only memory, hard disk drive, portable storage media drive such as for optical discs, magnetic discs, magneto-optical discs, etc., semiconductor memory cards, combinations of storage media, etc.), printer engine 604, scanner engine 605, network interface (I/F) 606, converter 608 for converting data from one format to another format (for example, a format suitable for printing, faxing, e-mailing, etc.), and user I/O (Input/Output) 609. The controller 602 also utilizes information stored in user management table 607 to authenticate the user and control user access to the functionalities of the MFD 600.

Storage 603 can include one or more storage parts or devices [e.g. a read only memory (for example, ROM, PROM, EPROM, EEPROM, etc.), a random access memory (RAM), a hard disk drive (HDD), portable media (for example, floppy disk, optical disc, magnetic discs, magneto-optical discs, semiconductor memory cards, etc.) drives], and program code instructions can be stored in one or more parts or devices of storage 603 and executed by the controller 602 to carry out the instructions. Such instructions can include instructions for performing specified functions (such as printing, scanning, faxing, copying, e-mailing, etc.) of the MFD 600, to enable the MFD 600 to interact with a terminal, as well as perhaps other external devices, through the network interface 606, and to control the converter 608, access data in the user management table 607, and interactions with users through the user I/O 609.

The network interface 606 is utilized by the MFD 600 to communicate with other network-connected devices such as a terminal or a print manager service providing apparatus (e.g. print manager service providing apparatus 101 of FIG. 1A) and receive data requests, print jobs, user interfaces, and etc.

The user I/O 609 includes one or more display screens that display, under control of controller 602, information allowing the user of the MFD 600 to interact with the MFD 600. The display screen can be any of various conventional displays (such as a liquid crystal display, a plasma display device, a cathode ray tube display, etc.), but preferably is equipped with a touch sensitive display (for example, liquid crystal display) and is configured to provide a GUI (graphical user interface) based on information input by an operator of the MFD 600, so as to allow the operator to interact conveniently with services provided on the MFD 600, or with the MFD 600 serving as terminal for accessing electronic data or other content through the network. User interfaces or other contents received through the network via the network interface 606 can be displayed on the display screen.

The display screen does not need to be integral with, or embedded in, a housing of the MFD 600, but may simply be coupled to the MFD 600 by either a wire or a wireless connection. The user I/O 609 may include keys and/or buttons (such as graphical keys or buttons, or other graphical elements, of a GUI on a touchscreen display) for inputting information or requesting various operations. Alternatively, the user I/O 609 and the display screen may be operated by a keyboard, a mouse, a remote control, voice recognition (e.g., through a speaker/microphone 609a), or eye-movement tracking, or a combination thereof.

Printer engine 604, scanner engine 605 and network interface 606 are otherwise conventional, and therefore, a detailed description of such conventional aspects is omitted in the interest of clarity and brevity.

The MFD 600 can have any or all of the functions of similar devices conventionally known, such as for scanning, editing and storing images, sending a fax, sending and receiving e-mails with or without attachments, accessing files by FTP or another protocol or facility, surfing the Web, etc. Further, multi-functional devices or multi-function peripheral devices can play a prominent role to convert hardcopy documents to electronic documents.

As discussed above, the MFD 600 may also operate as a print manager service providing apparatus (e.g. print manager service providing apparatus 101 of FIG. 1A). The operation of such print manager service providing apparatus according to an exemplary embodiment is described supra with reference to FIG. 1A.

Figure 7A:
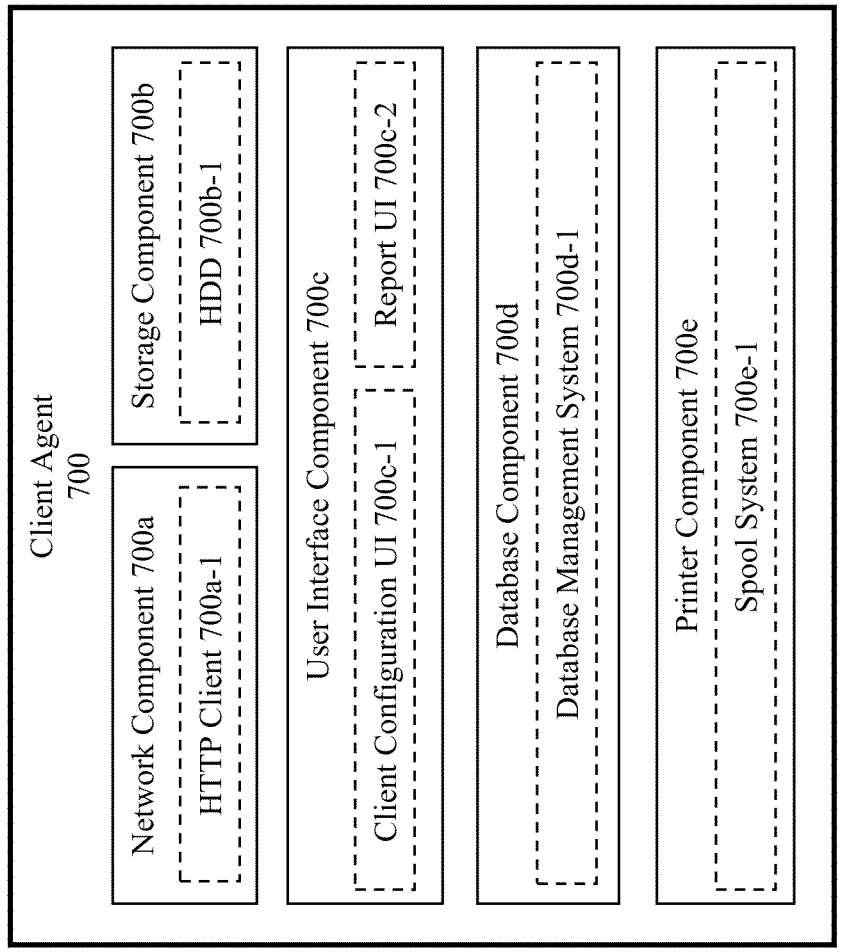
FIG. 7A shows a block diagram of an exemplary configuration of a client agent, according to an exemplary embodiment.

FIG. 7A shows an exemplary configuration of a client agent (e.g. print manager service client agent 103a of FIG. 1A). In the example of FIG. 7A, client agent 700 includes a network component 700a, a storage component 700b, a user interface component 700c, a database component 700d and a printer component 700e.

The network component 700a includes simple HTTP (Hypertext Transfer Protocol) client software for communicating with the server agent and downloading files from the server agent. The storage component 700b includes a hard disk drive (HDD) for storing the downloaded drivers and other files. Such storage component 700b can be local or via the network. The user interface component 700c provides the various user interfaces discussed in the present disclosure, including a configuration user interface for configuring client properties and a report user interface for displaying the log of the client agent activity (e.g. when printers are created, when the client agent accesses the server, etc.). The database component 700d includes a database management system for recording log/history, storing configuration files, drivers and configuration file association information, etc. For example, the information may be stored in one or more databases [e.g. off-the-shelf database applications based on SQL (Structured Query Language), or other customized database applications with search/query function]. If the information is stored in more than one location, the information may be synced, for example, periodically or upon a user request. The printer component 700e includes a spool system for adding/removing printers, adding/deleting driver files from the system.

Figure 7B:
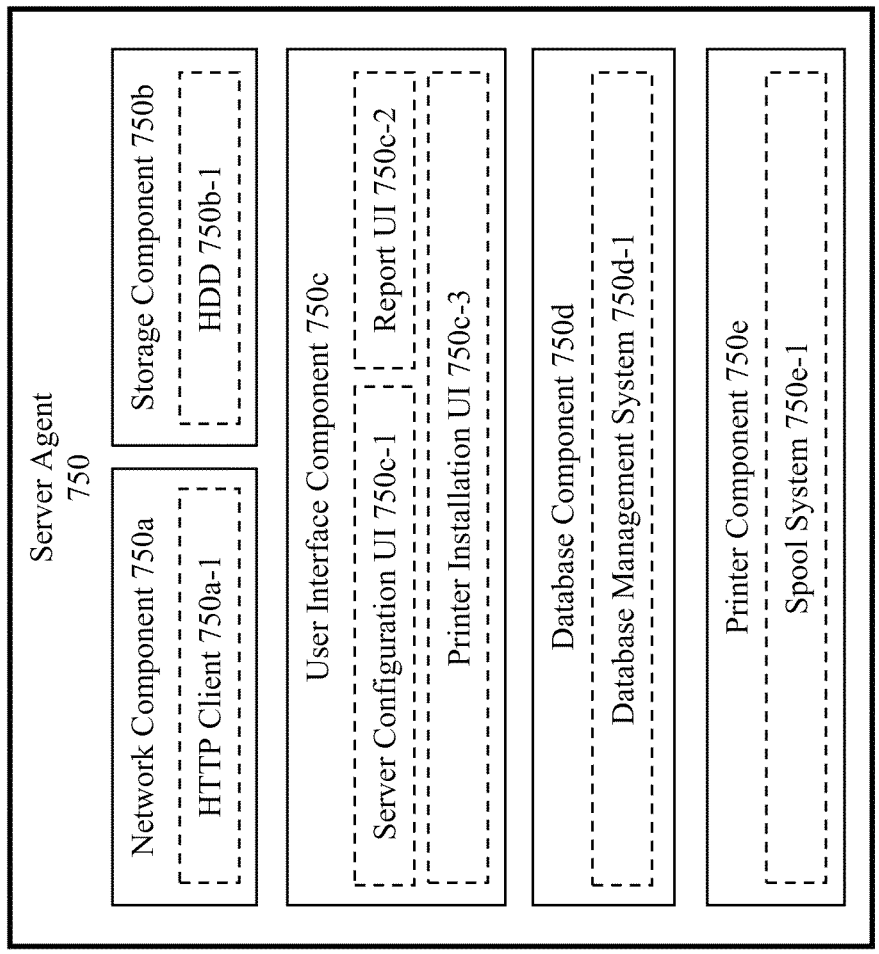
FIG. 7B shows a block diagram of an exemplary configuration of a server agent, according to an exemplary embodiment.

FIG. 7B shows an exemplary configuration of a server agent (e.g. manager service agent 101d of FIG. 1A). In the example of FIG. 7B, server agent 750 includes a network component 750a, a storage component 750b, a user interface component 750c, a database component 750d and a printer component 750e.

The network component 750a, the storage component 750b, the database component 750d and the printer component 750e are similar to the counterparts discussed with reference to FIG. 7A. The user interface component 750c further includes a printer installation user interface for associating one or more clients with certain printer configuration (e.g. printer settings).

FIG. 8A shows a screenshot of a printer list menu provided in an operating system or in an application software product for providing print services, according to an exemplary embodiment. For example, such a printer list menu screen is displayed to an administrator of a network environment who is in charge of overseeing and configuring the printers in the network environment at the print manager service providing apparatus 101 of FIG. 1A or the terminal 157 (including the print manager admin client agent 157a) of FIG. 1B. The printer list shown in FIG. 8A lists one or more printers that are registered in the system (e.g. Printers A-D). When the administrator selects one of the registered printers, printer information corresponding to the selected printer is displayed at the bottom of the screen, as shown in FIG. 8A. Such printer information includes printer name, model number, IP address, one or more groups of terminals having access to the printer, and etc. In the example of FIG. 8A, each group (e.g. legal and accounting) has a template associated therewith (e.g. template_1 and template_2). The templates indicate the printer settings to be applied when the printer is used by the specified groups. The printer information is not limited to that discussed in the present application, and may include other information regarding the printer.

At the top of the screen, buttons are provided for adding a new printer ("add printer"), configuring one or more printers ("configure printer"), uninstalling one or more existing printers ("uninstall printer"), configuring print manager settings ("settings"), generating reports ("reports"), displaying the recorded logs ("logs"), and obtaining additional details regarding the printer list ("help").

FIG. 8B shows a screenshot of a printer list menu provided to a user (e.g. User A) in the network environment who uses the services provided by the printers in the network environment, for example, at the terminal 103 of FIG. 1A or terminal 203 of FIG. 2. As shown in FIG. 8B, the number of printers shown is different from that of FIG. 8A, because User A is unable to access or has not installed some of the printers registered in the network environment (i.e. Printers A-D).

Figure 8D:
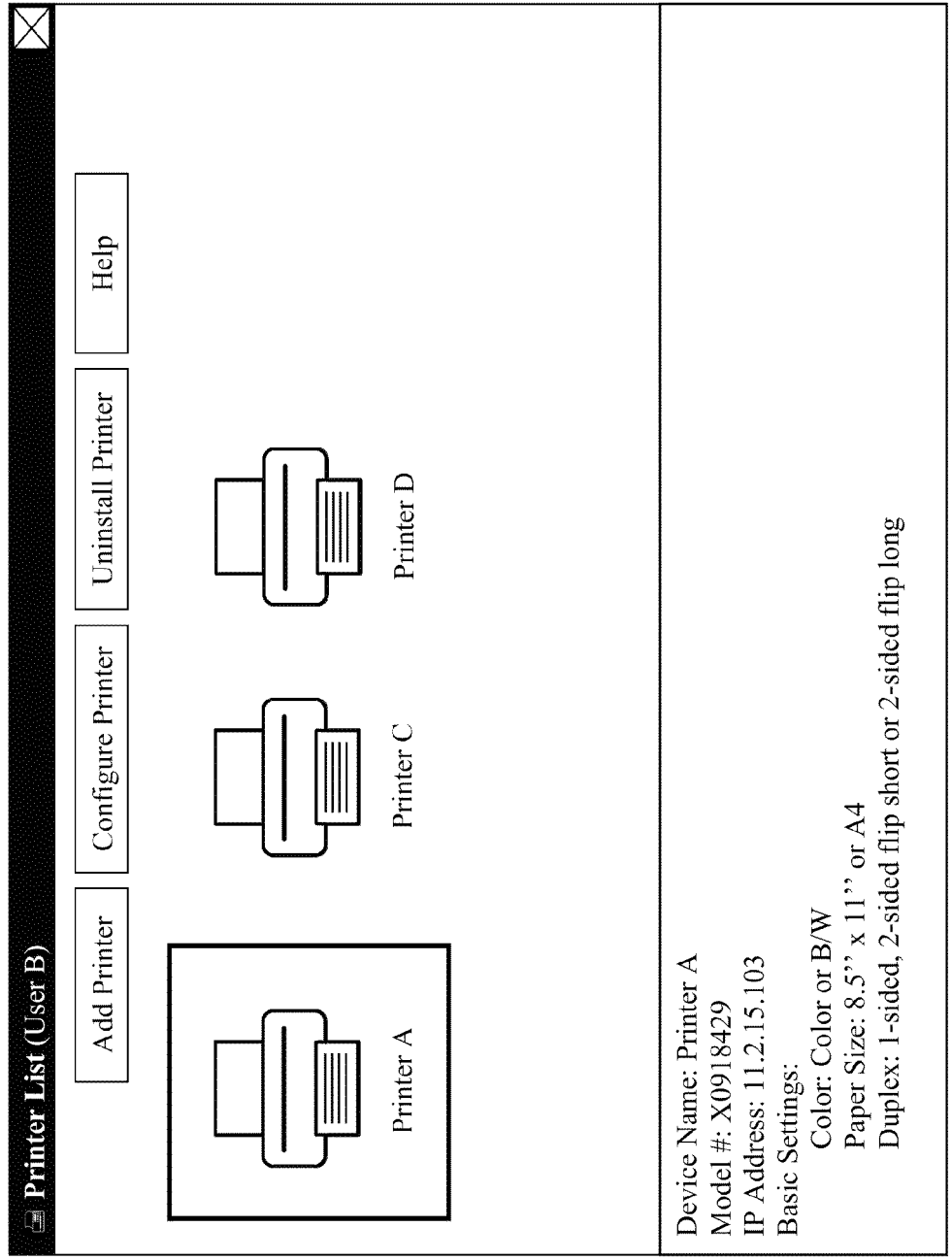
FIG. 8D shows sample screenshots of a user interface displayed to the user, according to an exemplary embodiment.

FIG. 8C shows a screenshot of a printer list menu provided to another user (e.g. User B) in the network environment who uses the services provided by the printers in the network environment, for example, at the terminal 103 of FIG. 1A or terminal 203 of FIG. 2. The printer list of FIG. 8C also differs from that of FIG. 8B, since User B's printer access differs from that of User A. Further, as shown in FIGS. 8B and 8C, the printer settings for the same printer ("Printer A") differ between the example of FIG. 8B and the example of FIG. 8C. FIG. 8D shows a screenshot of a printer list menu in which a new printer "Printer D" has been installed to the printer list menu of FIG. 8C.

The printer list UI (shown in FIGS. 8A-8C) allows the user to select one or more devices from the list and configure or uninstall the selected devices. As shown in FIG. 9A, the selection of a device is indicated by a rectangular box surrounding the printer icon. Each icon represents a printer registered in the system, and the administrator can configure each printer by selecting the printer icon corresponding to the printer and activating the "configure printer" button.

For example, when the user activates the "configure printer" button, a user interface for printer configuration is displayed to the user, as shown in FIG. 9A. In the example of FIG. 9A, the printer configuration UI includes a plurality of configurable print options (e.g. paper source, stapling, hole punching, etc.). Each print option may be edited to include more or fewer drop-down items (e.g. by activating the "edit" button located to the right of each print option). On the left side of the screen, there is provided a list of groups, which can be selected to display the settings associated with the selected group. Each group can further be configured by activating the "edit" button.

FIG. 9B shows the printer configuration UI in which the "accounting" group is selected. As shown in FIG. 9B, the print options displayed on the right side are different, indicating that the "accounting" group has print settings for Printer A which are different from those of the "legal" group.

Figure 9C:
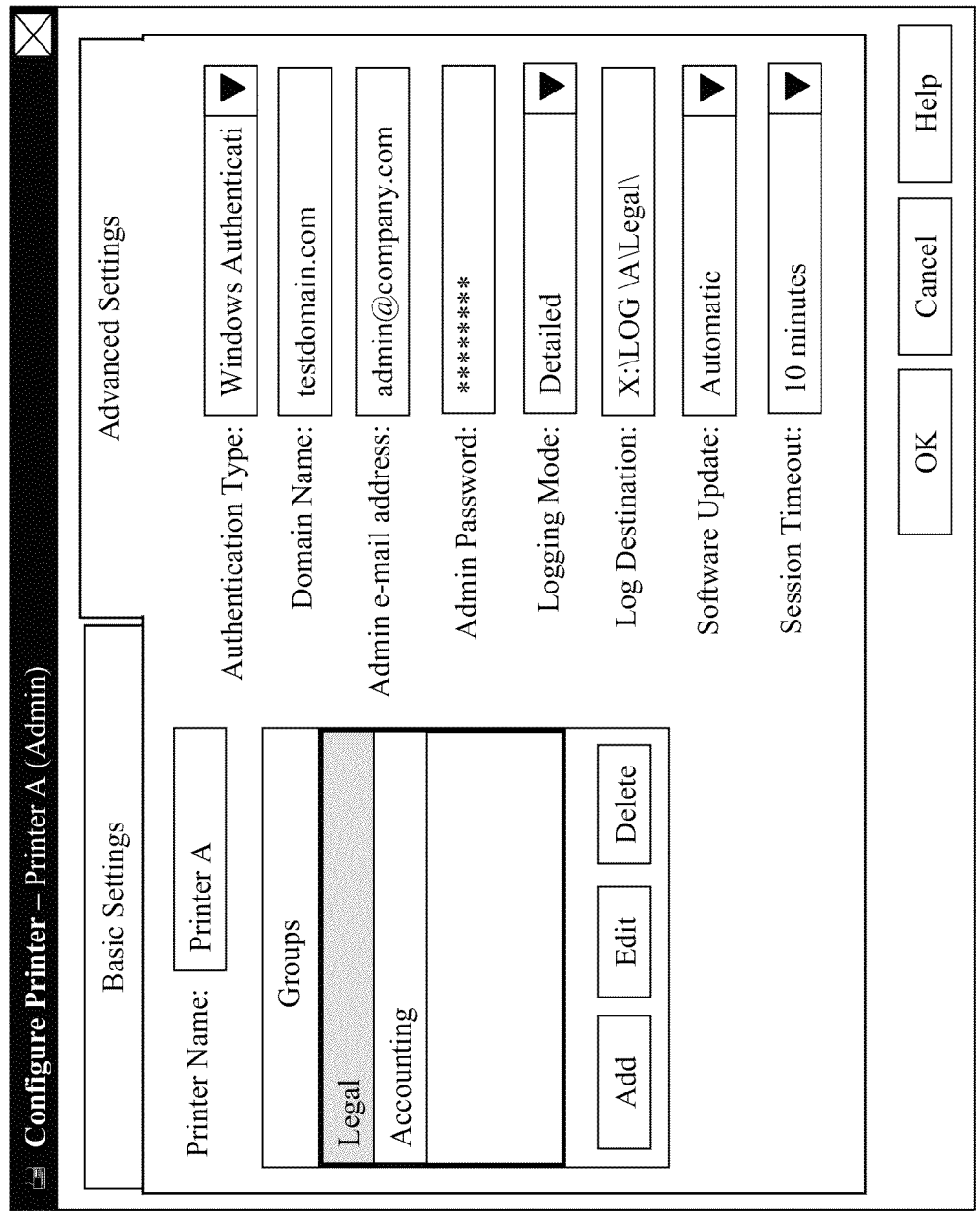
FIG. 9C shows a sample screenshot of a user interface for configuring a printer, according to an exemplary embodiment.
Figure 10B:
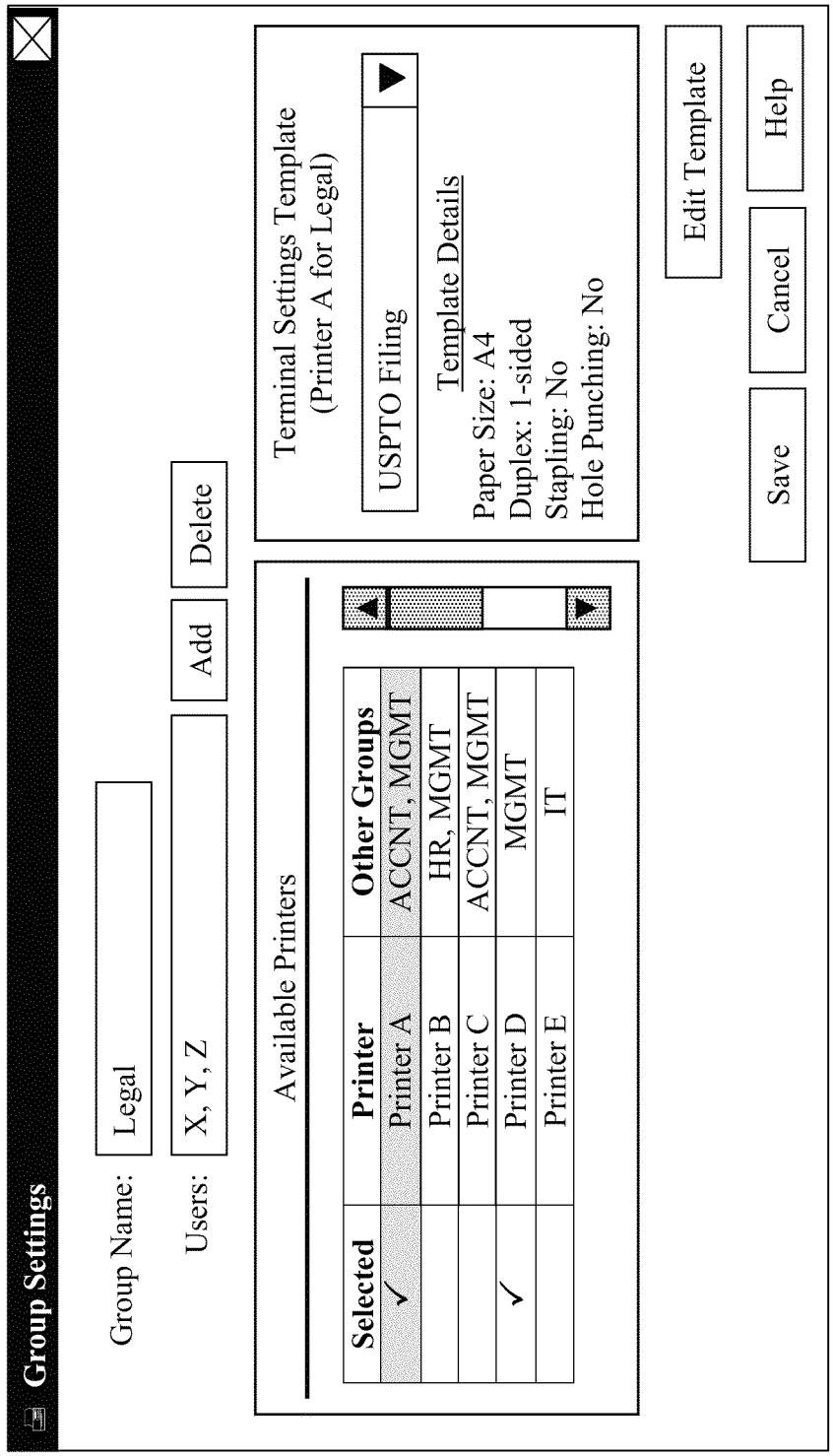

FIG. 9C shows the printer configuration UI in which basic settings (under the "basic settings" tab) and advanced settings (under the "advanced settings" tab) are displayed to the user. For example, the basic settings may include the settings shown in FIGS. 9A and 9B, such as color, duplex, hole-punch, etc. Such settings are user-selectable features and provided to all the users in the network environment. On the other hand, the advanced settings may be hardware-specific, and may include settings that vary depending on the device make of the printers, the operating system of the terminal apparatus, etc. In the example of FIG. 9C, the "edit" buttons shown in FIGS. 9A and 9B are missing because such advanced settings may not be configurable by regular non-admin users. Thus, the settings configured by the administrative user (e.g. at the terminal 157 of FIG. 1B) via the printer configuration UI of FIG. 9C may be transparent to non-admin users (e.g. at the terminal 103 of FIG. 1A). That is, such non-admin users may be unaware of the existence of such advanced settings.

Figure 9D:
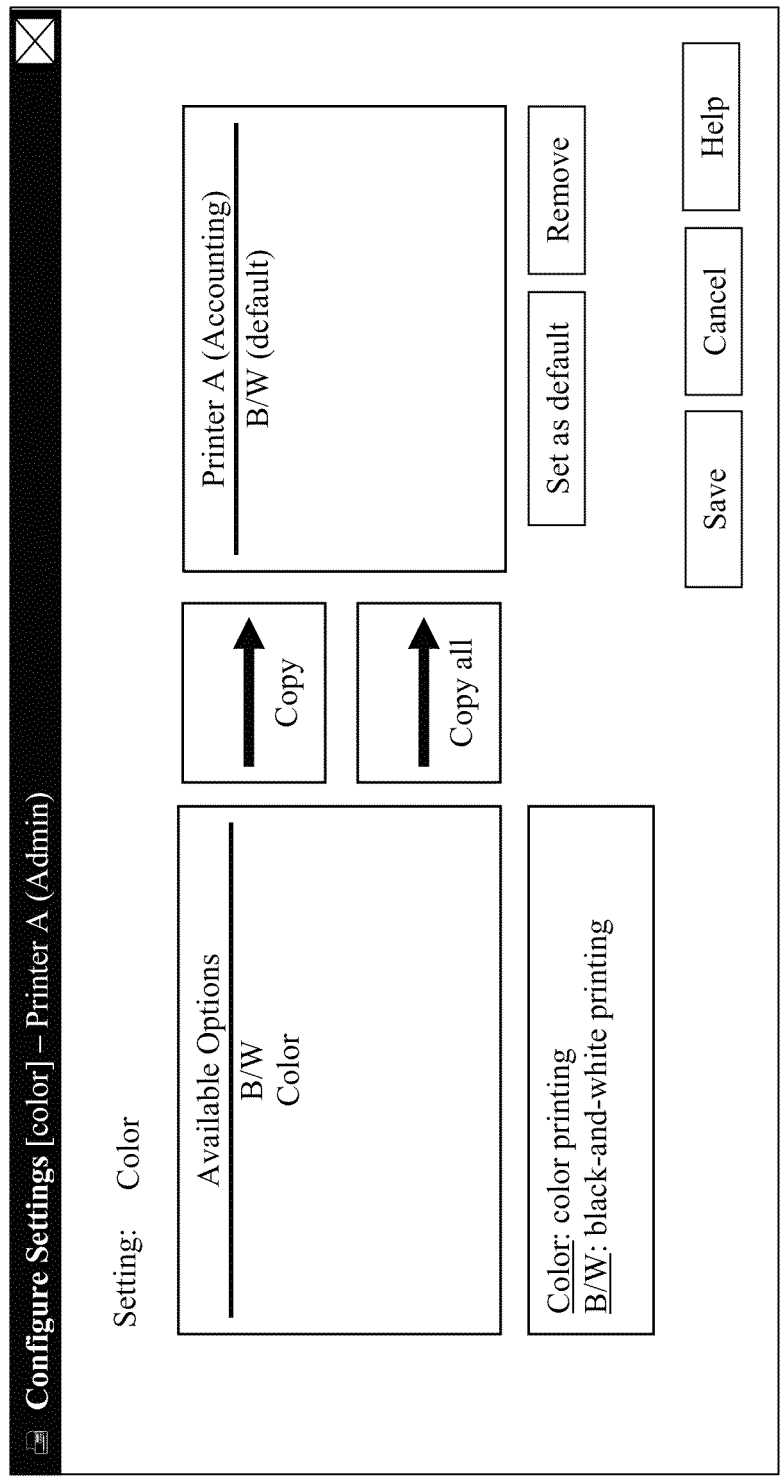
FIGS. 9D-9F show sample screenshots of a user interface for configuring a printer setting, according to an exemplary embodiment.
Figure 9E:
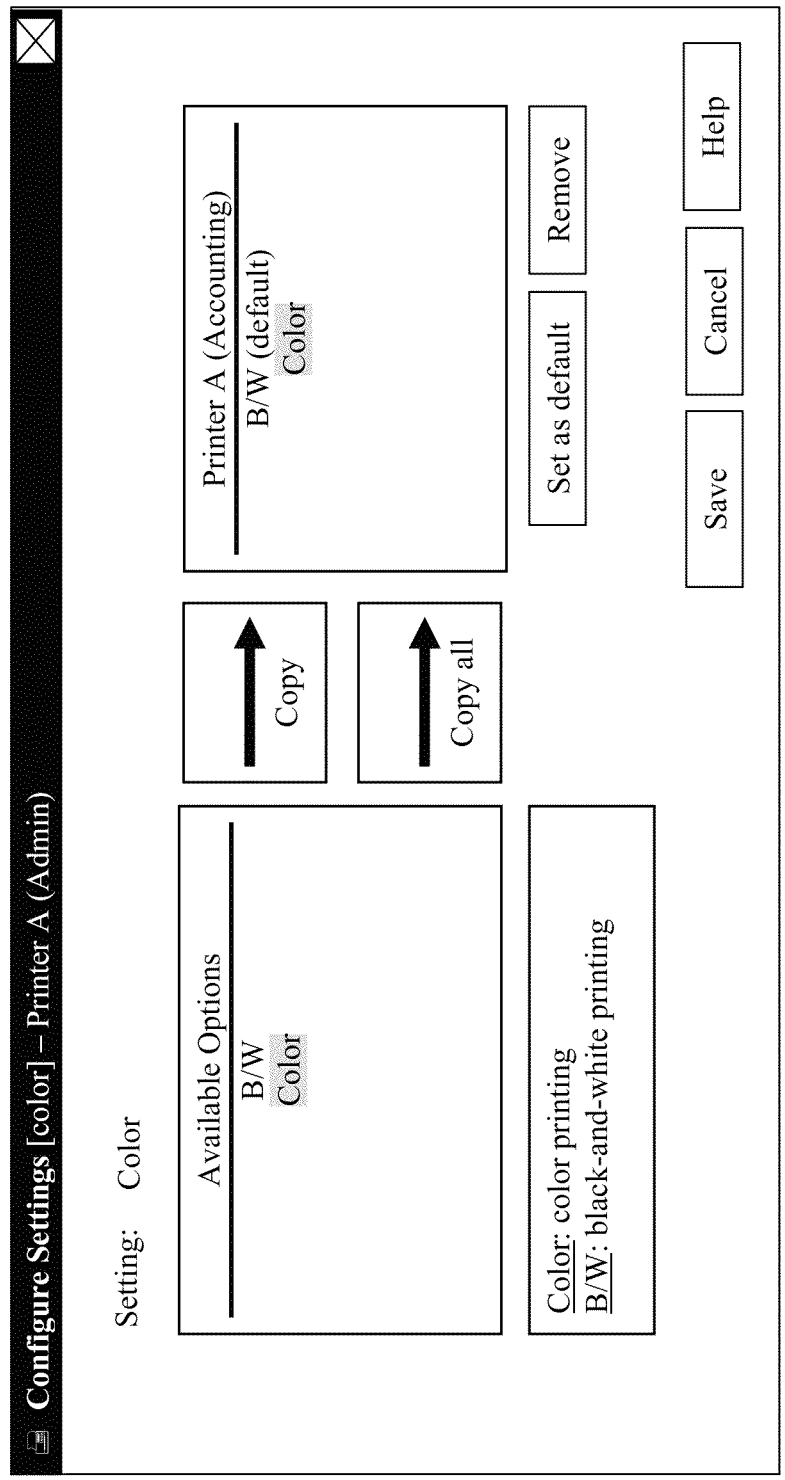
Figure 9F:
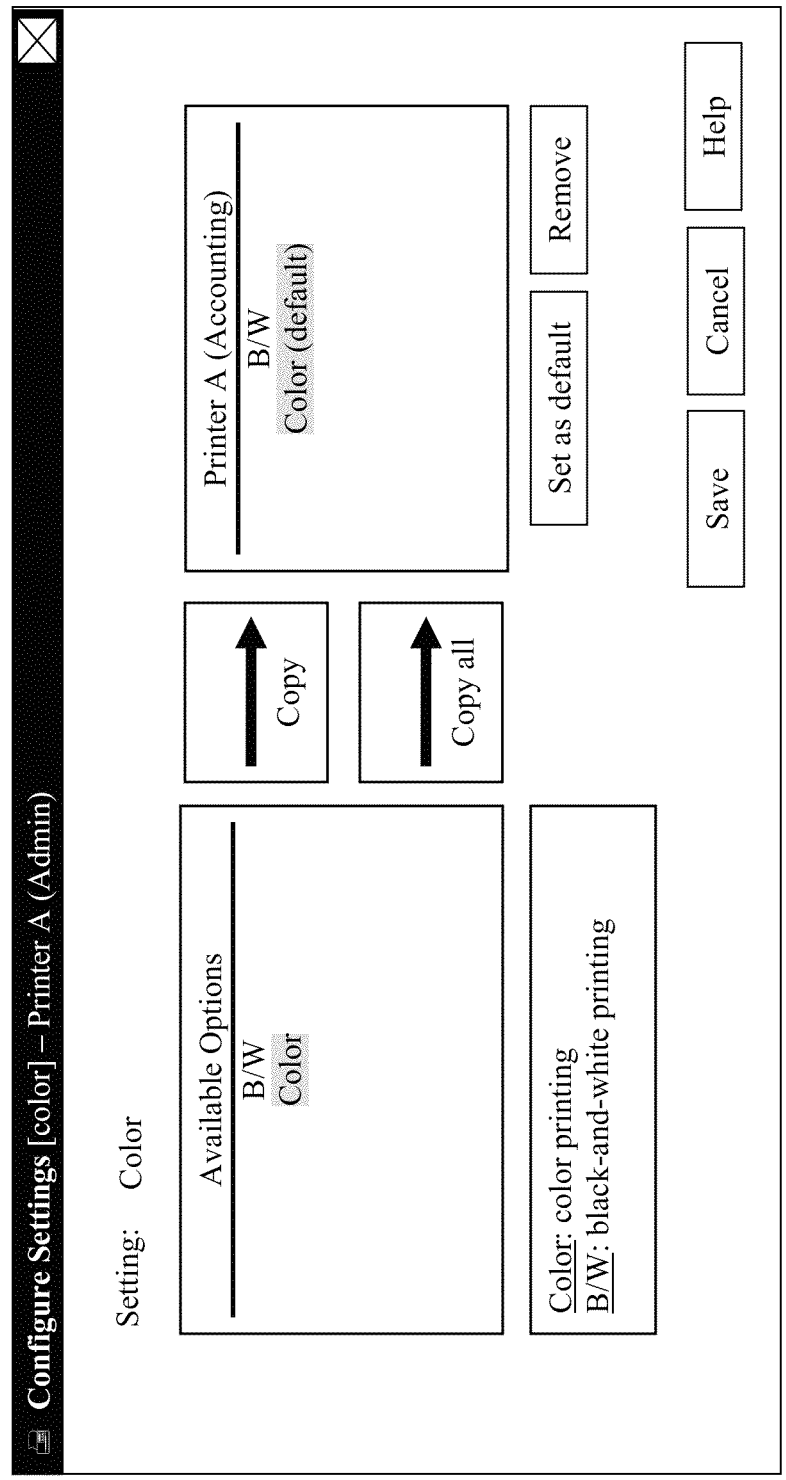

Referring back to FIG. 9B, when the "edit" button next to the "color" option is activated, for example, a screen for configuring the "color" option is displayed to the user (e.g. administrator), as shown in FIG. 9D. In the example of FIG. 9D, the only color option available when a member of the "accounting" group is using Printer A, is "B/W" (black and white). The user may select one of the available options on the left side (e.g. "color"), and copy the option to the right side, making the selected option available for the "accounting" group, as shown in FIG. 9E. The user can further set the new option as the default option, by selecting the "color" option and activating the "set as default" button, as shown in FIG. 9F. When the user activates the "save" button to save the changes, the user is returned to the printer configuration UI of FIG. 9G, which now indicates that the "color" is the default option for the color option.

Referring back to FIG. 8A, when the user selects the "configure groups" button, a user interface such as shown in FIG. 10A is displayed. As shown in FIG. 10A, the user interface displays a list of groups (e.g. "legal", "IT", "accounting", "HR", "management", etc.) along with the printers and users associated with each group. Each letter listed under the "printers" column may represent a single printing device (e.g. Printer A) or a group of printing devices (e.g. Printer Group A). Similarly, each letter listed under the "users" column may represent a single user (e.g. User X) or a group of users (e.g. User Group X). The administrator may use the "add" button to add a new group to the list, and the "edit" button to edit an existing group, and the "delete" button to delete a group.

For example, when the administrator selects a group and activates the "edit" button, a user interface for configuring the group settings such as shown FIG. 10B may be displayed. Using the user interface of FIG. 10B, the administrator may specify the name of the group, users associated with the group (e.g. using the "add" and "delete" buttons), and printers associated with the group. As indicated by the checkmarks, "Printer A" and "Printer D" are included in the "LEGAL" group. The user interface may also allow the administrator to specify a terminal settings template which specifies the various settings to be used for a selected printer (e.g. Printer A in FIG. 10B). In the example of FIG. 10B, the user has selected the template "USPTO filing" for Printer A, and such selected terminal settings template is associated with the user of the selected printer ("Printer A") by the particular group ("legal"). FIG. 10B shows that "Printer A" is included in groups "ACCNT" (Accounting) and "MGMT" (Management) in addition to the "LEGAL" group. As discussed with reference to FIGS. 9A and 9B, one set of settings may be applied for the use of a printer by one group of users, and a different set of settings may be applied for the use of the same printer by another group of users.

Figure 10C:
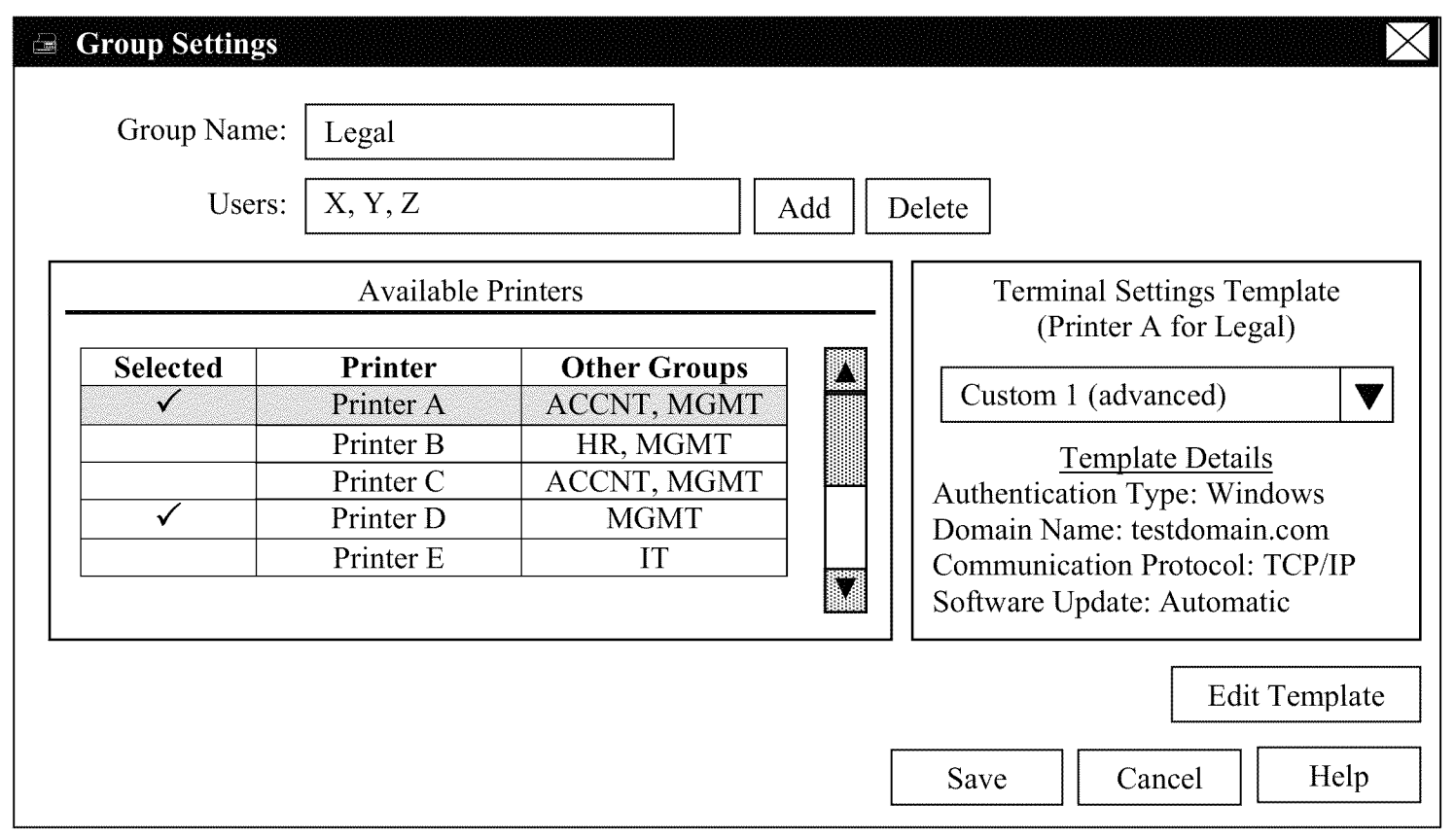

As shown in FIG. 10C, advanced settings, which may not be configurable by non-admin users (e.g. at the terminal 103 of FIG. 1A), may be configured via the user interface of FIG. 10C, for example, by selecting one of the terminal settings templates (e.g. "Custom 1"). The user interface also displays the details of the selected template, as shown in FIG. 10C.

FIG. 11A shows a user interface for configuring the print manager service settings, which is displayed, for example, when the user activates the "settings" button in the printer list screen shown in FIG. 8A. As shown in FIG. 11A, the user can specify the HTTP server IP address (not limited to an IP address, and could also be a URL) and the port, sleep mode time span (time span after which the print manager enters a sleep mode or is suspended), operation trigger time (the maximum amount of time for which the print manager remains suspended or in the sleep mode), printer deletion policy (which specifies the action to be taken upon deletion of any printer), client update order (the order in which, for example, the printer driver is updated for the plurality of terminals in the network environment), and installation policy, which may include settings for force install (e.g. downgrading an existing driver in the client), force setting (e.g. changing printer settings on the client terminal to match the printer settings on the server) and clean printers (e.g. deleting printers in the client terminal that are unmatched to the list of printers in the server).

Figure 11B:
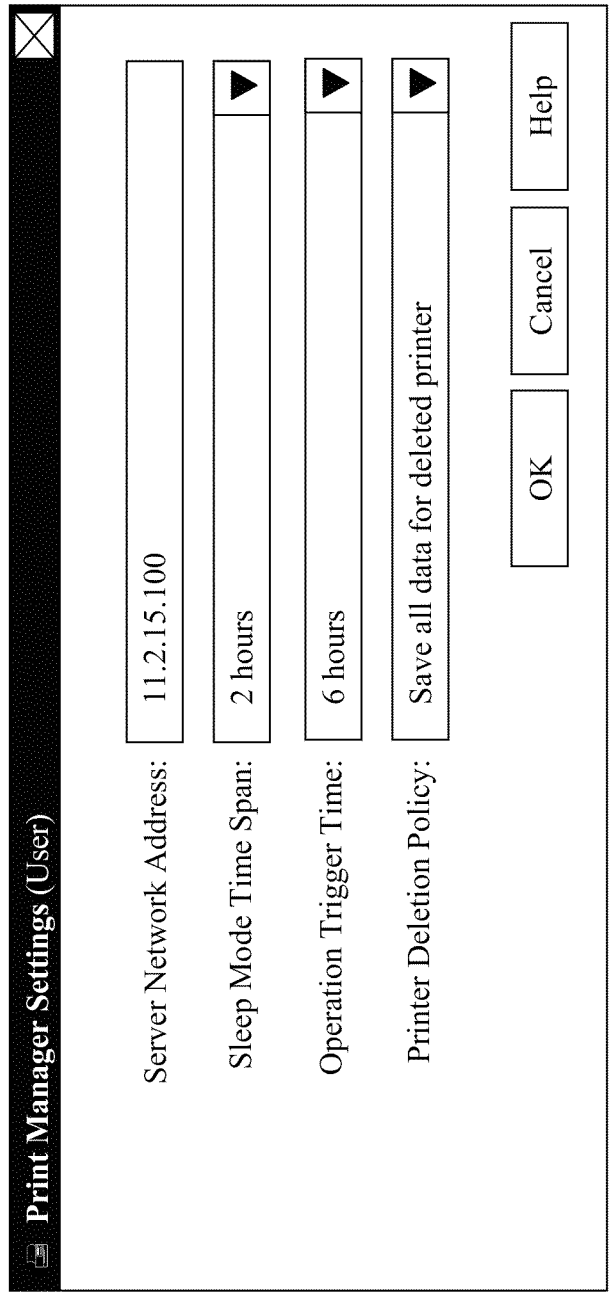
FIG. 11B shows a sample screenshot of a user interface for configuring print manager settings, according to another exemplary embodiment.

FIG. 11B shows a user interface for configuring the print manager service client settings, which allows the user at a terminal (e.g. terminal 203 of FIG. 2) to view and/or configure settings for the print manager service client provided to the terminal. As discussed above with reference to FIG. 11A, the user interface of FIG. 11B includes settings such as a server network address, a sleep mode time span, after which the print manager service client enters a sleep mode or is suspended, an operation trigger time indicating the maximum amount of time in which the print manager service client remains suspended or in the sleep mode, and a printer deletion policy governing deletion of any printer from the printer icon information.

FIG. 12 shows a user interface for generating a report based on a transaction history log maintained by the print manager, which is displayed, for example, when the user activates the "reports" button in the printer list screen shown in FIG. 8A. As shown in FIG. 12, the user can specify the date range, printer and user for which/whom the report is to be generated. As discussed above, the "printer" and "user" options may represent printer groups and user groups, respectively. Further, the user interface allows the user to specify the output format of the report to be generated. When the user activates the "generate report" button at the bottom of the screen, a report is generated based on the options specified by the user.

Figure 13A:
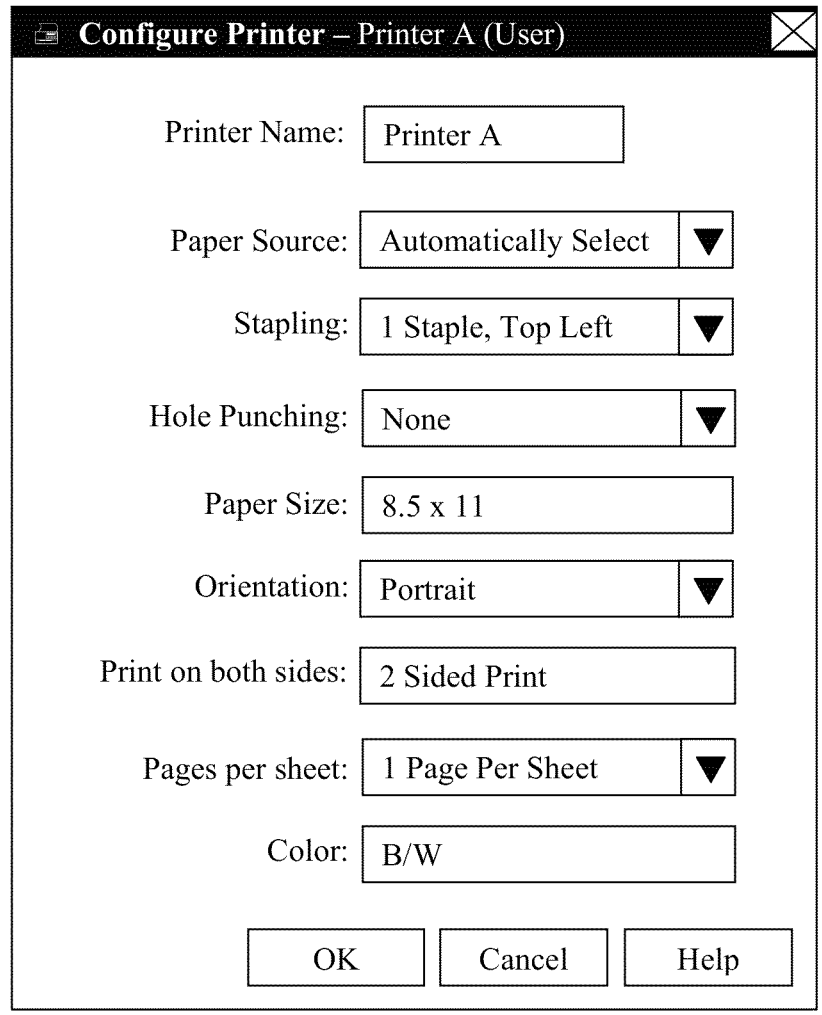
FIG. 13A shows a sample screenshot of a user interface for configuring a printer, according to an exemplary embodiment.

FIG. 13A shows a user interface for configuring the settings for a printer ("Printer A") displayed to a user, for example, when the user activates the "configure printer" button of the printer list screen shown in FIG. 8B. As shown in FIG. 13A, compared to the user interface shown in FIG. 9A, which is displayed to an administrator of the network environment, the user interface of FIG. 13A includes fewer configurable options (e.g. missing the list of groups, and the "edit" button for further configuring each of the options. In an exemplary embodiment, even after the user configures the printer to suit his or her printing preference, the administrator of the network environment may later disable or change one or more of the options, causing the user to lose his or her previous configuration. An example of a table storing the user preference settings information specified via the user interface such as shown in FIG. 13A is shown in FIG. 13B.

Figure 14:
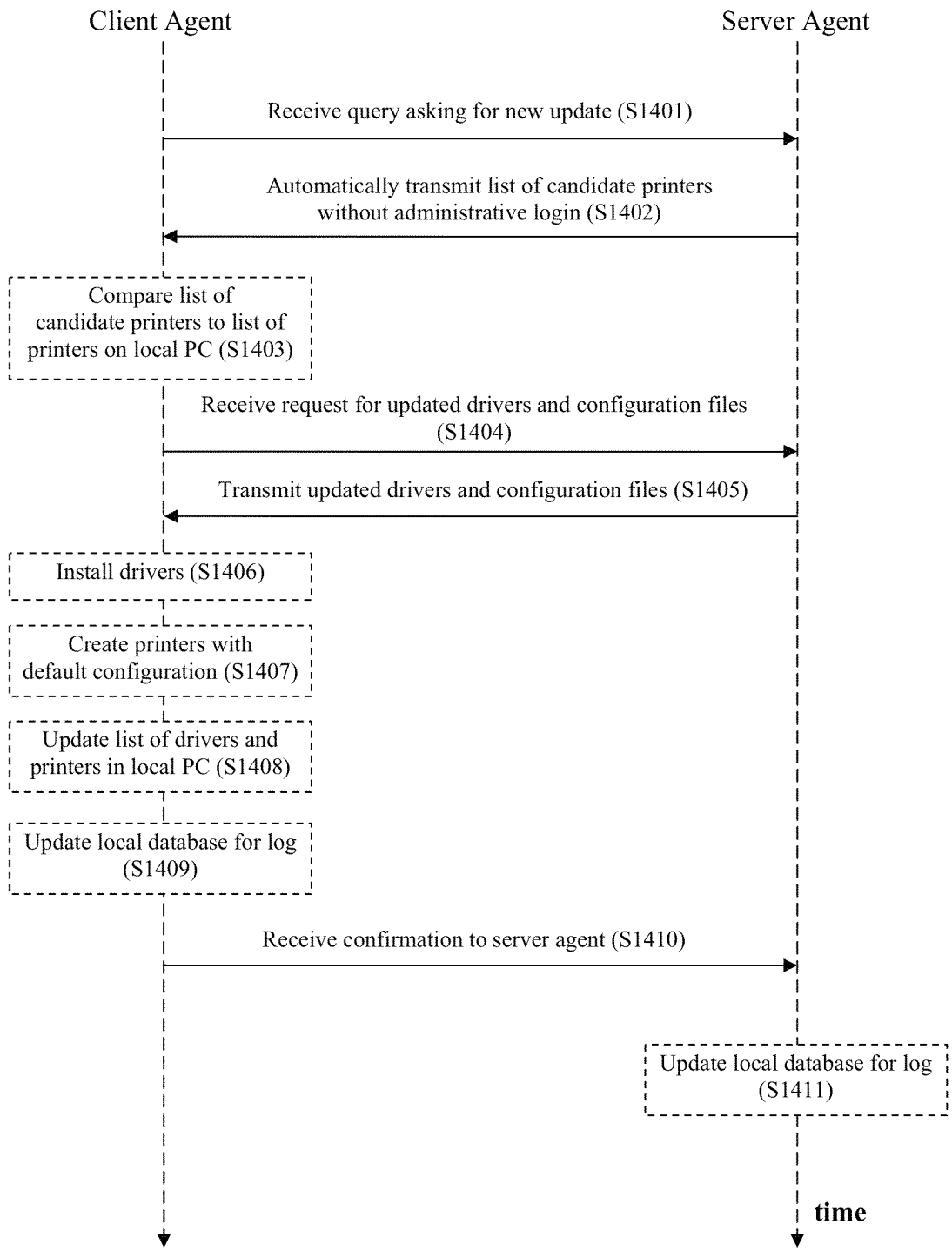
FIG. 14 shows a work flow of a method performed by a print manager service client agent, such as illustrated in FIG. 1A, according to an exemplary embodiment.

Turning now to FIG. 14, there is shown a work flow in a method performed by a print manager service client agent, such as illustrated in FIG. 1A, according to an exemplary embodiment.

In S1401, the server agent receives a query from the client agent asking for any new updates. In return, the server agent automatically transmits, without administrator login on the print manager service providing apparatus on which the server agent is operating, a list of candidate printers to the client agent (step S1402). That is, the server agent automatically transmits the list of candidate printers without requiring administrator privileges, without any action by the user at the terminal on which the client agent is operating or the print manager service providing apparatus on which the server agent is operating. For example, such list contains all the printers in the network environment that should be currently accessible by the terminal apparatus on which the client agent operates. The client agent compares the list of candidate printers to a list of printers installed on the terminal apparatus (e.g. local PC) (step S1403). If the client agent determines that one or more printers included in the list of candidate printers are not included in the list of printers installed on the terminal apparatus, or if the client agent determines the drivers for any of the installed printers are outdated), the client agent requests updated drivers and configuration files (step S1404), and the server agent transmits updated drivers and files to the client agent (step S1405). Using the downloaded drivers and files, the client agent installs the drivers (step S1406), creates printers with default configuration (step S1407), and updates the list of drivers and printers on the terminal apparatus (step S1408). The client agent updates the log maintained in the local database (step S1409) and returns confirmation to the server agent. When the server agent receives the confirmation (step S1410), the server agent updates the log maintained in the local database (step S1411). For example, FIG. 8D shows a printer list UI shown to the user ("User B") after the new printer "Printer D" has been installed on the terminal apparatus used by "User B".

Figure 15:
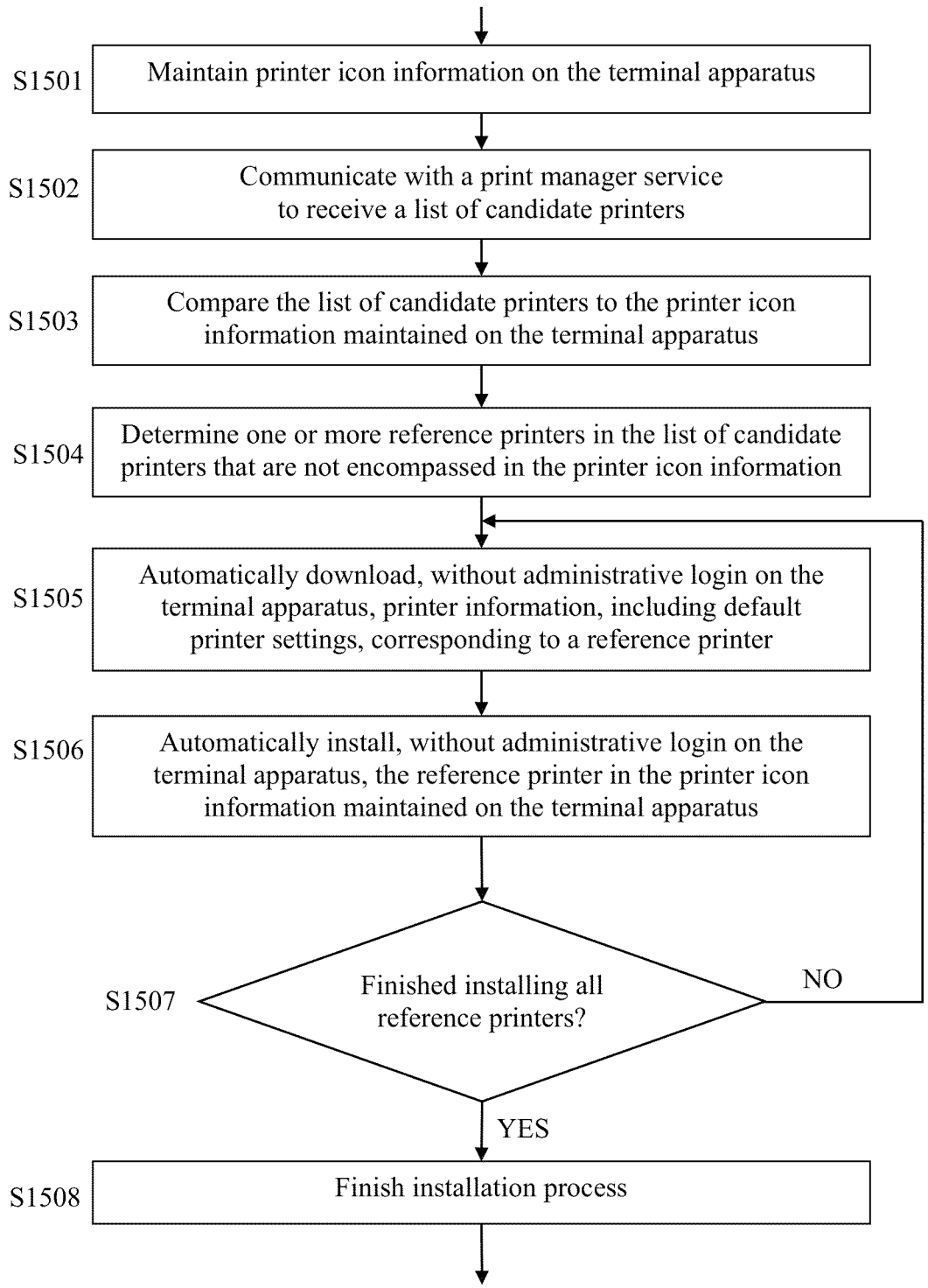
FIG. 15 shows a flow chart of a method performed by a print manager service client agent, such as illustrated in FIG. 1A, according to an exemplary embodiment.

Turning now to FIG. 15, there is shown a flowchart of a method performed by a print manager service client agent, such as illustrated in FIG. 1A, according to an exemplary embodiment.

The print manager service client agent operating on a terminal apparatus maintains printer icon information (e.g., including the printer icon created and maintained for each printer installed on the terminal apparatus) on the terminal apparatus (step S1501) and communicates with a print manager service to receive a list of candidate printers (step S1502). The print manager service client agent compares the list of candidate printers to the printer icon information maintained on the terminal apparatus (step S1503) and determines one or more reference printers in the list of candidate printers that are not encompassed in the printer icon information (step S1504). The print manager service client agent automatically downloads, without administrative login on the terminal apparatus, printer information, including default printer settings, corresponding to one of such reference printers (step S1505) and automatically installs, without administrative login on the terminal apparatus, the reference printer in the printer icon information maintained on the terminal apparatus (step S1506). That is, the print manager service client agent automatically downloads and installs the printers without requiring administrator privileges, without any action by the user at the terminal on which the print manager service client agent is operating. If it is determined in S1507 that all of the reference printers determined to be not encompassed in the printer icon information has been installed in the printer icon information (YES, S1507), the print manager service client agent finishes the installation process (step S1508). If it is determined in S1507 that one or more of such reference printers have not been installed (NO, S1507), the print manager service client agent repeats the downloading (S1505) and installing (S1506) process for each of such remaining reference printers.

Figure 16:
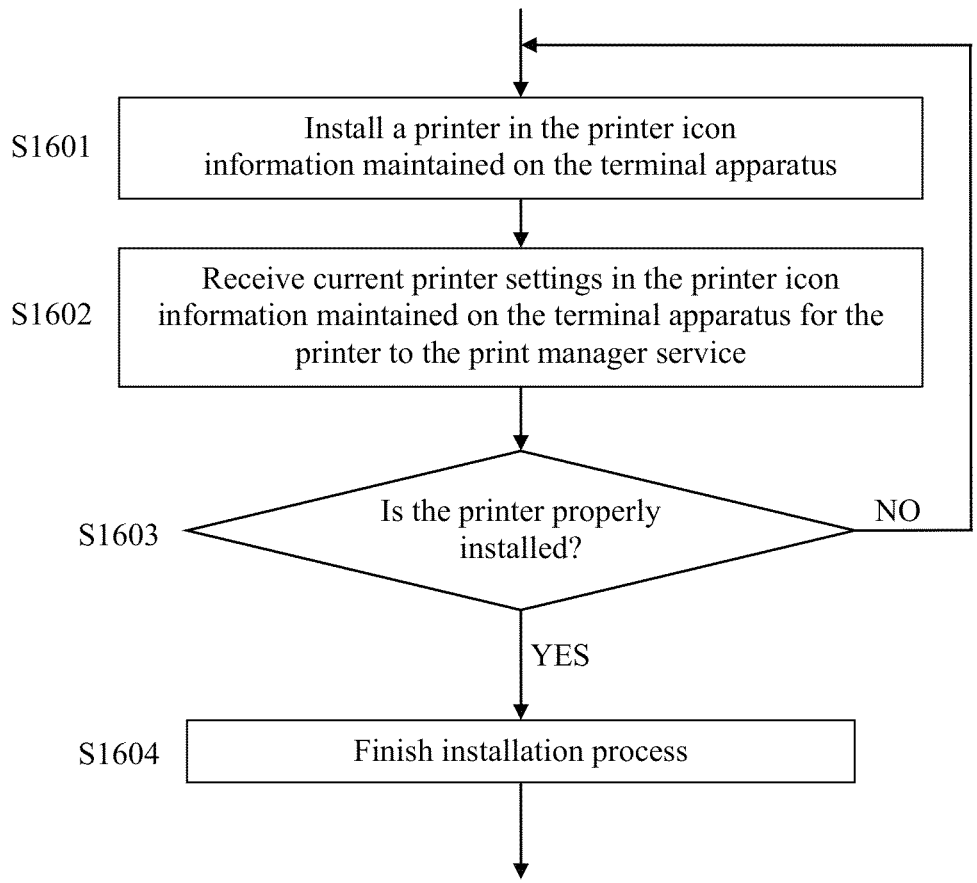
FIG. 16 shows a flow chart of a method performed by a print manager service client agent, such as illustrated in FIG. 1A, according to an exemplary embodiment.

Turning now to FIG. 16, there is shown a flowchart of a method performed by a print manager service client agent, such as illustrated in FIG. 1A, according to an exemplary embodiment.

After the print manager service causes a printer to be installed in the printer icon information maintained on the terminal apparatus (step S1601), the print manager service receives current printer settings in the printer icon information maintained on the terminal apparatus for the printer from the print manager server client agent, to check the current printer settings to verify that the specific printer is properly installed (step S1602). The current printer settings may be any properties of the installed printer that may indicate whether or not the printer is properly installed, including the IP address, port number, name, model number, print settings, and so forth. For example, the print manager service may check if any of the current printer settings is a null value, or check whether the current printer settings violate any predetermined rules (e.g. indicating ranges of values that particular printer settings need to stay within). If it is determined that the specific printer is properly installed, the installation process is finished (step S1603), and otherwise, the specific printer is reinstalled by repeating the installation (step S1601) and verification (S1602 and S1603) process.

Figure 17:
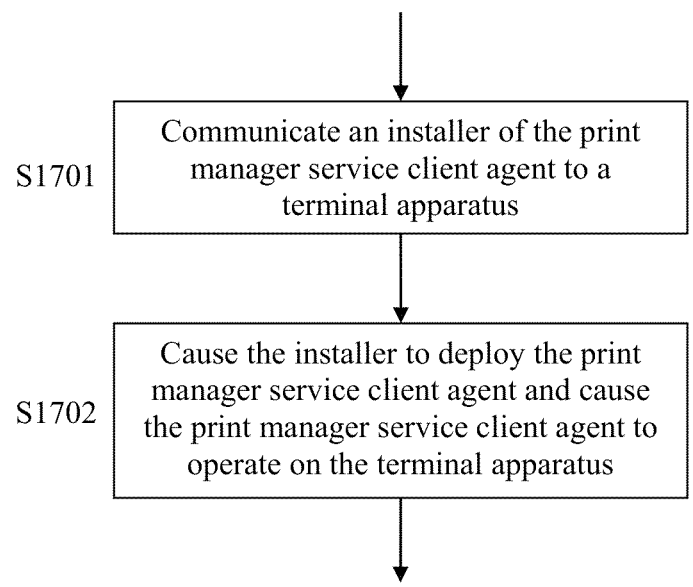
FIG. 17 shows a flow chart of a method performed by a print manager service providing apparatus, such as illustrated in FIG. 1A, according to an exemplary embodiment.

Turning now to FIG. 17, there is shown a flowchart of a method performed by a print manager service providing apparatus, such as illustrated in FIG. 1A, according to an exemplary embodiment.

In S1701, the print manager service providing apparatus communicates an installer of the print manager service client agent to a terminal apparatus. The installer is a software package that installs the client agent, and the installer may be, for example, a URL pointing the installation files which are executed to install the client agent. The installer deploys a print manager service client agent on the particular terminal apparatus and causes the print manager service client agent to operate on the particular terminal apparatus (step S1702). For example, "to operate" means the client agent is actually running, not merely installed on the particular terminal apparatus.

Figure 18:
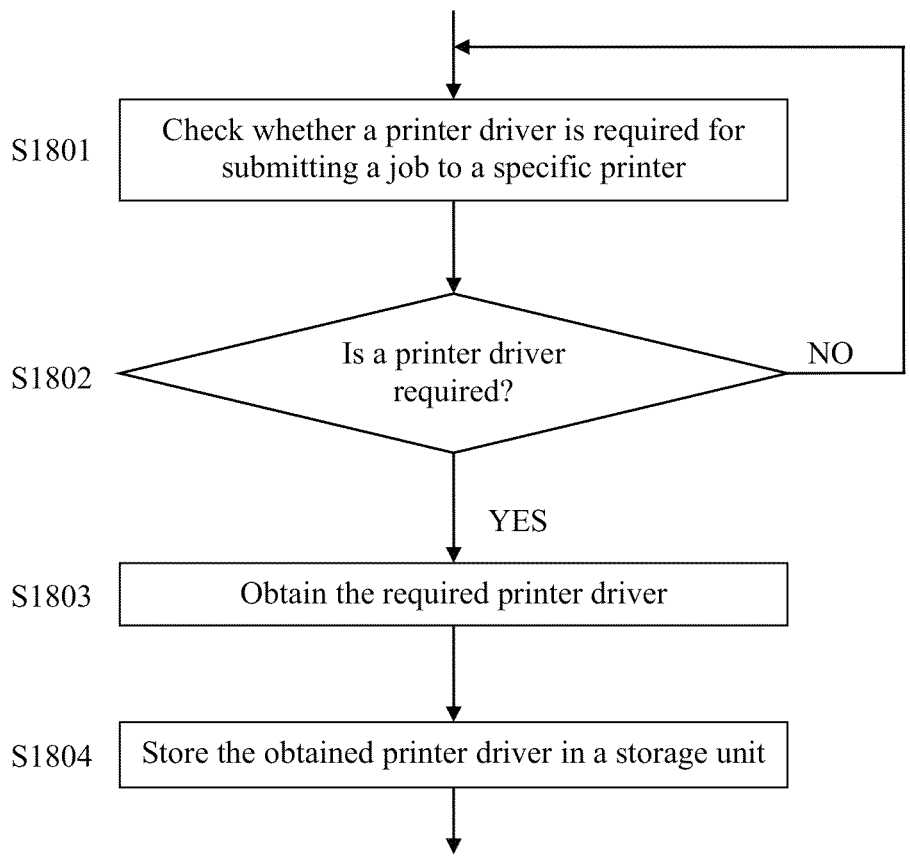
FIG. 18 shows a flow chart of a method performed by a print manager service client agent, such as illustrated in FIG. 1A, according to an exemplary embodiment.

Turning now to FIG. 18, there is shown a flowchart of a method performed by a print manager service client agent, such as illustrated in FIG. 1A, according to an exemplary embodiment.

The print manager service client agent determines whether a printer driver is required by the terminal apparatus for submitting a job to a specific printer (step S1801), and in a case that the printer driver is required by the terminal apparatus (YES, S1802), the print manager service client agent communicates with the print manager service to obtain the required printer driver for the specific printer (step S1803) and stores the printer driver for the specific printer in a storage unit of the terminal apparatus, without administrative login on the terminal apparatus (step S1804).

Figure 19:
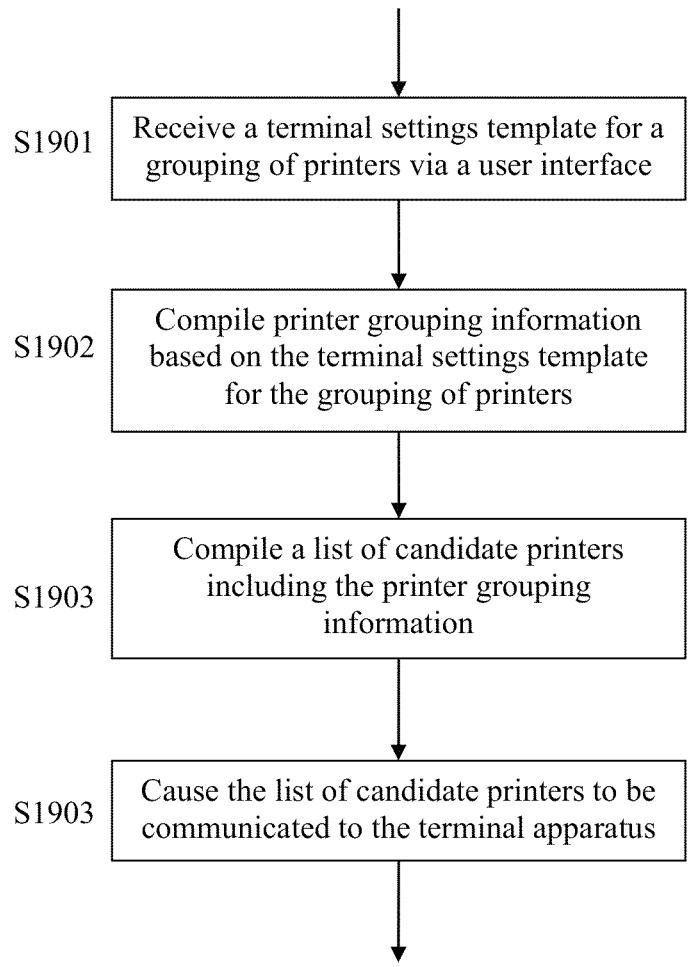
FIG. 19 shows a flow chart of a method performed by a print manager service providing apparatus, such as illustrated in FIG. 1A, according to an exemplary embodiment.

Turning now to FIG. 19, there is shown a flowchart of a method performed by a print manager service providing apparatus, such as illustrated in FIG. 1A, according to an exemplary embodiment.

The print manager service providing apparatus receives a user specification of a terminal settings template for a grouping of printers via a user interface (step S1901) and compiles printer grouping information based on the terminal settings template specified for the grouping of printers (step S1902). The print manager service providing apparatus further compiles a list of candidate printers including the printer grouping information (step S1903) and causes the list of candidate printers to be communicated to the terminal apparatus (step S1904).

Figure 20:
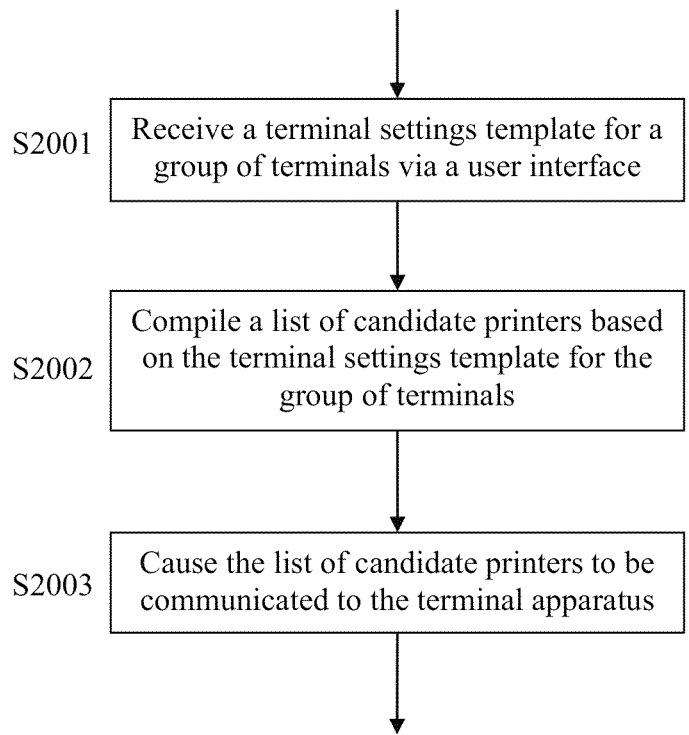
FIG. 20 shows a flow chart of a method performed by a print manager service providing apparatus, such as illustrated in FIG. 1A, according to an exemplary embodiment.

Turning now to FIG. 20, there is shown a flowchart of a method performed by a print manager service providing apparatus, such as illustrated in FIG. 1A, according to an exemplary embodiment.

The print manager service providing apparatus receives a user specification of a terminal settings template for a group of terminals via a user interface (step S2001) and compiles a list of candidate printers based on the terminal settings template specified for the group of terminals (step 2002). The print manager service providing apparatus causes the list of candidate printers to be communicated to the terminal apparatus (step S2003).

Figure 21:
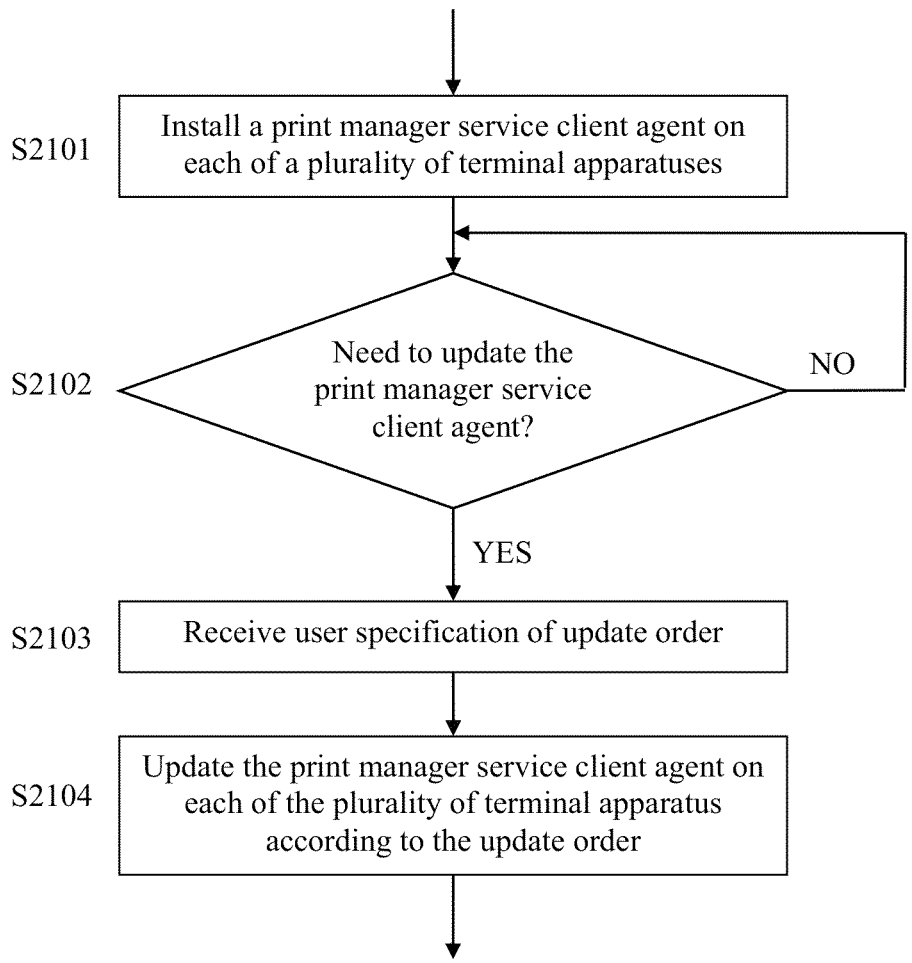
FIG. 21 shows a flow chart of a method performed by a print manager service providing apparatus, such as illustrated in FIG. 1A, according to an exemplary embodiment.

Turning now to FIG. 21, there is shown a flowchart of a method performed by a print manager service providing apparatus, such as illustrated in FIG. 1A, according to an exemplary embodiment.

After the print manager service providing apparatus causes a print manager service client agent to be installed on each of a plurality of terminal apparatuses in the network environment (step S2101), the print manager service providing apparatus determines whether a client update process needs to be performed by checking whether an update is needed or upon receiving a user request to perform an update (step S2102). If it is determined that a client update process needs to be performed (YES, step S2102), the print manager service providing apparatus receives a user specification of an update order, which specifies the order in which the client terminals should be updated (step S2103), and updates the print manager service client agent on each of the plurality of terminal apparatuses according to the user-specified update order (step S2104). In an exemplary embodiment, the update order may specify that only a subset of the plurality of terminal apparatuses are to be updated.

The aforementioned specific embodiments are illustrative, and many variations can be introduced on these embodiments without departing from the spirit of the disclosure or from the scope of the appended claims. For example, elements and/or features of different examples and illustrative embodiments may be combined with each other and/or substituted for each other within the scope of this disclosure and appended claims.

What is claimed is:

1. A system for providing print services over a network, said system comprising:
   a plurality of terminal apparatuses, wherein each client terminal apparatus amongst the plurality of terminal apparatuses has a print manager service client agent operating thereon, and the print manager service client agent maintains printer icon information on the client terminal apparatus; and
   a print manager service providing apparatus that is configured to communicate through the network with the print manager service client agent operating on the client terminal apparatus and upon communication with the print manager service client agent operating on the client terminal apparatus, provides automatically without any action by a user, a list of candidate printers to the print manager service client agent, wherein
   the print manager service client agent on the client terminal apparatus operates in an automated manner to compare, without any action by the user, the list of candidate printers to the printer icon information maintained on the client terminal apparatus, and in a case that one or more referenced printers in the list of candidate printers is not encompassed in the printer icon information, the print manager service client agent operating in the automated manner, without any action by the user, downloads from the print manager service providing apparatus, with respect to each specific printer amongst the referenced printers not encompassed in the printer icon information, printer information, including default printer settings, for the specific printer and installs the specific printer in the printer icon information maintained on the client terminal apparatus, without administrative login on the terminal apparatus.

2. The system of claim 1, wherein
   the print manager service client agent operating on the particular terminal apparatus, upon installation of the specific printer in the printer icon information maintained on the particular terminal apparatus, communicates current printer settings, in the printer icon information maintained on the particular terminal apparatus for the specific printer, via the network to the print manager service providing apparatus, and
   the print manager service providing apparatus checks the current printer settings, received from the print manager service client agent, to verify that the specific printer is properly installed in the printer icon information maintained on the particular terminal apparatus.

3. The system of claim 1, wherein the print manager service providing apparatus communicates an installer of the print manager service client agent to the particular terminal apparatus, and the installer, communicated by the print manager service providing apparatus to the particular terminal apparatus, deploys the print manager service client agent on the particular terminal apparatus and causes the print manager service client agent to operate on the particular terminal apparatus.

4. The system of claim 1, wherein the print manager service providing apparatus comprises:

a printer information maintaining part that maintains printer information for a plurality of registered printers; and a user interface part to provide a user interface for specifying groupings of printers selected from the plurality of registered printers, wherein at least one specific printer is included in each of at least two groupings of printers, and the specific printer is represented by a single printer icon in the user interface and is associated with each of said at least two groupings of printers, and default printer settings maintained by the printer information maintaining part for the specific printer in association with one grouping amongst said at least two groupings of printers are different than default printer settings maintained by the printer information maintaining part for the specific printer in association with another grouping amongst said at least two groupings of printers.

5. The system of claim 1, wherein the print manager service providing apparatus includes:

a user interface part to provide a user interface for specifying a terminal settings template for a grouping of printers; and a manager service agent that communicates with the print manager service client agent on the particular terminal apparatus, compiles printer grouping information based on the terminal settings template for the grouping of printers, compiles the list of candidate printers including the printer grouping information, and causes the list of candidate printers to be communicated to the particular terminal apparatus.

6. The system of claim 1, wherein the print manager service providing apparatus comprises:

a printer information maintaining part that maintains printer information for a plurality of registered printers; and a user interface part to provide a user interface for specifying groups of terminals selected from the plurality of terminal apparatuses, wherein default printer settings maintained by the printer information maintaining part for a specific printer in association with one group of terminals amongst the plurality of terminal apparatuses are different than default printer settings maintained by the printer information maintaining part for the specific printer in association with another group of terminals amongst the plurality of terminal apparatuses, and the specific printer is represented by a single printer icon in the user interface and is associated with each of said one group of terminals and said another group of terminals.

7. The system of claim 1, wherein the print manager service providing apparatus includes:

a user interface part to provide a user interface for specifying a terminal settings template for a group of terminals amongst the plurality of terminal apparatuses; and a manager service agent that communicates in turn with each specific terminal amongst the group of terminals, including communicating with the print manager service client agent on the specific terminal, compiles the list of candidate printers based on the terminal settings template for the group of terminals, and causes the list of candidate printers to be communicated to the specific terminal.

8. The system of claim 1, wherein the print manager service providing apparatus is configured to perform a client update process to update the print manager service client agent on each of the plurality of terminal apparatuses, and the print manager service providing apparatus includes a configuration user interface for a user to configure the print manager service providing apparatus, wherein the configuration user interface permits the user to specify an order in which the plurality of terminal apparatuses are to be updated.

9. The system of claim 1, wherein the communication by the print manager service providing apparatus of the list of candidate printers through the network to the print manager service client agent operating on the particular terminal apparatus is automated, without administrative login on the print manager service providing apparatus and without administrative login on the particular terminal apparatus, and is transparent to a user of the particular terminal apparatus and to a user of the print manager service providing apparatus, and the download by the print manager service client agent of the printer information including the default printer settings for the specific printer from the print manager service providing apparatus is automated, without administrative login on the print manager service providing apparatus and without administrative login on the particular terminal apparatus, and is transparent to the user of the particular terminal apparatus and to the user of the print manager service providing apparatus.

10. The system of claim 1, wherein the print manager service providing apparatus includes:

a data management part that maintains a transaction history log including information indicating when printers are created, and information indicating transactions with the plurality of terminal apparatuses; and a user interface part to provide a report user interface for the user to specify a report to be generated.

11. A print manager service client including one or more programs of computer-executable instructions embodied in a non-transitory computer-readable medium and executable by a processing unit of a terminal apparatus, without administrative login, to configure the terminal apparatus to include:

a printer information maintenance part that maintains printer icon information on the terminal apparatus; and a printer information update part that, without any action by a user, (i) communicates through a network communication unit of the terminal apparatus with a print manager service to receive a list of candidate printers, and (ii) compares the list of candidate printers to the printer icon information maintained by the printer information maintenance part on the terminal apparatus, wherein in a case that one or more referenced printers in the list of candidate printers is not encompassed in the printer icon information maintained on the terminal apparatus, the printer information update part, without any action by a user, downloads, with respect to each specific printer amongst the referenced printers not encompassed in the printer icon information, printer information, including default printer settings, for the specific printer and installs, without administrative login on the terminal apparatus, the specific printer in the printer icon information maintained by the printer information maintenance part.

12. The print manager service client of claim 11, wherein the printer information update part determines whether a printer driver is required by the terminal apparatus for submitting a job to the specific printer, and in the case that the printer information update part determines that a printer driver is required by the terminal apparatus, the printer information update part communicates with the print manager service to obtain the required printer driver for the specific printer and stores the printer driver for the specific printer in a storage unit of the terminal apparatus, without administrative login on the terminal apparatus.

13. The print manager service client of claim 11, further comprising:
a user interface part that provides a configuration user interface for a user to configure the print manager service client, wherein
the configuration user interface permits the user to configure the properties of the print manager service client, including: network address of the print manager service; a time span of the print manager service client, after which time span, the print manager service client enters a sleep mode or is suspended; a trigger time indicating a maximum amount of time in which the print manager service client remains suspended or in the sleep mode, after which the print manager service client returns to operation; printer deletion policy governing deletion of any printer from the printer icon information.

14. The print manager service client of claim 11, further comprising:
a data management part that maintains a transaction history log indicating transactions with the print manager service, printer configuration files, printer drivers, and configuration file association information.

15. The print manager service client of claim 11, wherein operation of the print manager service client on the terminal apparatus is automated, does not require administrative login on the terminal apparatus, and is transparent to a user of the terminal apparatus.

16. A method performed by a print manager service client executing on a terminal apparatus, said method comprising:

(a) maintaining printer icon information on the terminal apparatus;
(b) communicating, without any action by a user, through a network communication unit of the terminal apparatus with a print manager service to receive a list of candidate printers;
(c) comparing, without any action by the user, the list of candidate printers to the printer icon information maintained in (a);
(d) determining that one or more referenced printers in the list of candidate printers is not encompassed in the printer icon information maintained on the terminal apparatus, and for each specific printer amongst the referenced printers not encompassed in the printer icon information, and without administrative login on the terminal apparatus, downloading, without any action by the user, printer information, including default printer settings, for the specific printer and installing the specific printer in the printer icon information maintained on the terminal apparatus.

17. The method of claim 16, wherein
each of (a) through (d) is automated, is without administrative login on the terminal apparatus, and is transparent to a user of the terminal apparatus.

18. The method of claim 16, further comprising:
communicating, upon installation of the specific printer in the printer icon information maintained on the particular terminal apparatus, current printer settings, in the printer icon information maintained on the terminal apparatus for the specific printer, via the network to the print manager service, for the print manager service to check the current printer settings to verify that the specific printer is properly installed in the printer icon information maintained on the terminal apparatus.

* * * * *